United States Patent
Dinan

(10) Patent No.: US 12,206,621 B2
(45) Date of Patent: *Jan. 21, 2025

(54) RESTARTING A DEACTIVATION TIMER OF A SECONDARY CELL IN A WIRELESS NETWORK

(71) Applicant: Ofinno, LLC, Reston, VA (US)

(72) Inventor: Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,200

(22) Filed: Nov. 16, 2023

(65) Prior Publication Data

US 2024/0195574 A1  Jun. 13, 2024

Related U.S. Application Data

(63) Continuation of application No. 17/313,724, filed on May 6, 2021, now Pat. No. 11,824,810, which is a continuation of application No. 16/432,259, filed on Jun. 5, 2019, now Pat. No. 11,005,633, which is a continuation of application No. 15/972,466, filed on May 7, 2018, now Pat. No. 10,341,074, which is a
(Continued)

(51) Int. Cl.
*H04L 5/00* (2006.01)
*H04W 52/02* (2009.01)

(52) U.S. Cl.
CPC .......... *H04L 5/0053* (2013.01); *H04L 5/0007* (2013.01); *H04L 5/0032* (2013.01); *H04L 5/0094* (2013.01); *H04W 52/02* (2013.01); *H04W 52/0235* (2013.01); *H04L 5/001* (2013.01); *Y02D 30/70* (2020.08)

(58) Field of Classification Search
CPC ... H04L 5/0053; H04L 5/0007; H04L 5/0032; H04L 5/0094; H04W 52/02; H04W 52/0235

See application file for complete search history.

(56) References Cited

U.S. PATENT DOCUMENTS

| | | |
|---|---|---|
| 8,855,095 B2 | 10/2014 | Tseng |
| 8,976,765 B2 | 3/2015 | Dinan |
| 9,392,600 B2 | 7/2016 | Bostrom et al. |

(Continued)

OTHER PUBLICATIONS

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.
(Continued)

*Primary Examiner* — Brian D Nguyen
(74) *Attorney, Agent, or Firm* — Reese Bastian; Kavon Nasabzadeh; Jacob L. Mangan

(57) ABSTRACT

A base station transmits, to a wireless device, a resource assignment indicating a plurality of time intervals of a secondary cell for communicating with the wireless device. The base station restarts a deactivation timer associated with the secondary cell in response to communicating, via the secondary cell, an uplink packet or a downlink packet with the wireless device during a first time interval of the plurality of time intervals.

20 Claims, 18 Drawing Sheets

Related U.S. Application Data continuation of application No. 15/130,511, filed on Apr. 15, 2016, now Pat. No. 9,967,076.

(60) Provisional application No. 62/148,700, filed on Apr. 16, 2015.

(56) References Cited

U.S. PATENT DOCUMENTS

| | | | |
|---|---|---|---|
| 9,681,432 | B2 | 6/2017 | Jang et al. |
| 9,686,814 | B2 | 6/2017 | Wang |
| 9,755,813 | B2 | 9/2017 | Lee et al. |
| 2011/0243106 | A1 | 10/2011 | Hsu et al. |
| 2012/0082107 | A1 | 4/2012 | Ou et al. |
| 2013/0083707 | A1 | 4/2013 | Wang |
| 2013/0114398 | A1 | 5/2013 | Wang |
| 2013/0188600 | A1 | 7/2013 | Ye |
| 2013/0336298 | A1 | 12/2013 | Dinan |
| 2014/0029563 | A1 | 1/2014 | Kim |
| 2014/0050113 | A1 | 2/2014 | Rosa et al. |
| 2014/0177500 | A1 | 6/2014 | Han et al. |
| 2015/0036614 | A1 | 2/2015 | Lee |
| 2015/0049739 | A1 | 2/2015 | Lee et al. |
| 2015/0092707 | A1 | 4/2015 | Kwon |
| 2015/0092713 | A1 | 4/2015 | Pelletier et al. |
| 2015/0124789 | A1 | 5/2015 | Jang et al. |
| 2015/0215825 | A1 | 7/2015 | Kim |
| 2015/0236825 | A1 | 8/2015 | Park et al. |
| 2015/0245344 | A1 | 8/2015 | You et al. |
| 2015/0256305 | A1 | 9/2015 | Yerramalli et al. |
| 2016/0028572 | A1 | 1/2016 | Suzuki et al. |
| 2016/0044641 | A1 | 2/2016 | Bai et al. |
| 2016/0128003 | A1 | 5/2016 | Callender |
| 2016/0157219 | A1 | 6/2016 | Uemura |
| 2016/0165627 | A1 | 6/2016 | Uemura |
| 2016/0242184 | A1* | 8/2016 | Dinan ................ H04W 72/20 |
| 2017/0195028 | A1* | 7/2017 | Shimezawa .......... H04B 7/0626 |
| 2017/0285105 | A1* | 10/2017 | Uemura ............... H04W 72/23 |
| 2017/0347270 | A1* | 11/2017 | Iouchi .................. H04L 5/0098 |
| 2017/0359850 | A1 | 12/2017 | Loehr et al. |
| 2018/0027461 | A1 | 1/2018 | Jia et al. |
| 2018/0049186 | A1 | 2/2018 | Hong et al. |
| 2018/0184348 | A1* | 6/2018 | Uemura ................ H04W 48/20 |
| 2022/0279453 | A1* | 9/2022 | Dinan ............... H04W 56/0005 |
| 2022/0418002 | A1 | 12/2022 | Dinan |

OTHER PUBLICATIONS

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.

3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.

3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.

3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.

3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.

R2-104504; 3GPP TSG-RAN WG2 Meeting #70bis; Aug. 23-27, 2010, Madrid, Spain; Source: Panasonic Title: UE behaviour for activation and deactivation of Scells and details of MAC CE for CC Management; Agenda Item: 7.1.1.2; Document for: Discussion, Decision.

R2-104506; 3GPP TSG RAN WG2 Meeting #71; Madrid, Spain, Aug. 23-27, 2010; Source: CATT, CMCC; Title: UL CC Activation/Deactivation; Agenda Item: 7.1.1.2; Document for: Discussion and Decision.

* cited by examiner

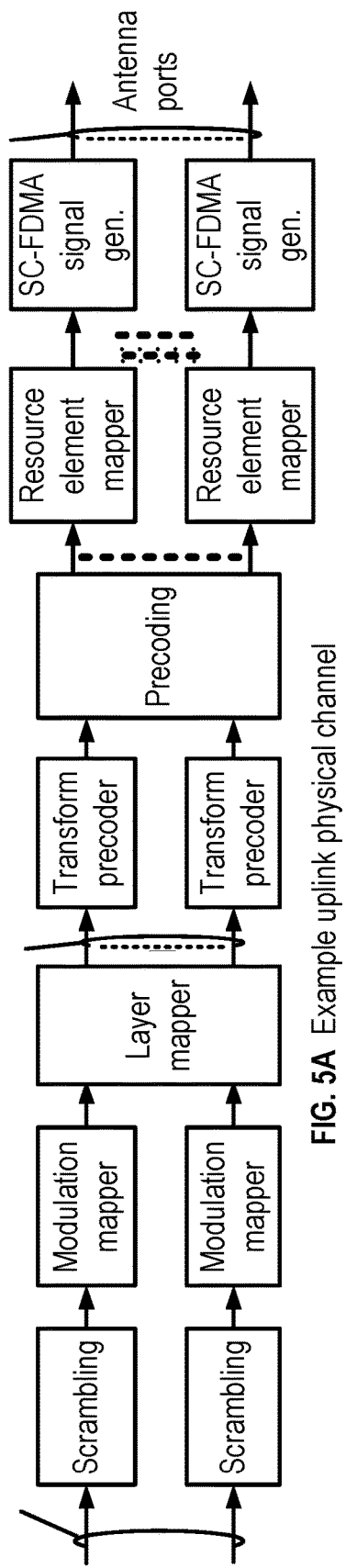
FIG. 5A Example uplink physical channel
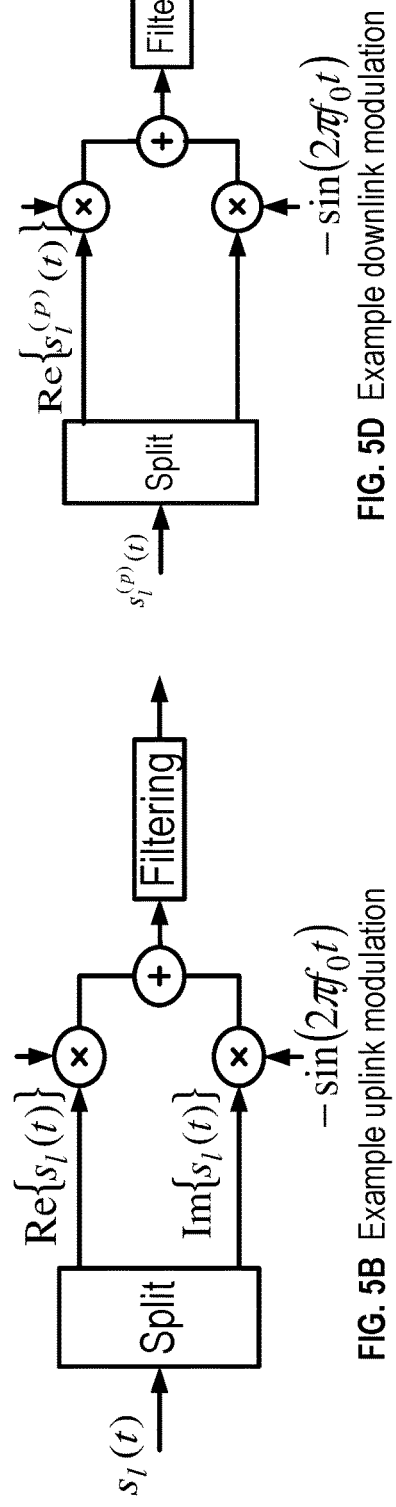
FIG. 5B Example uplink modulation
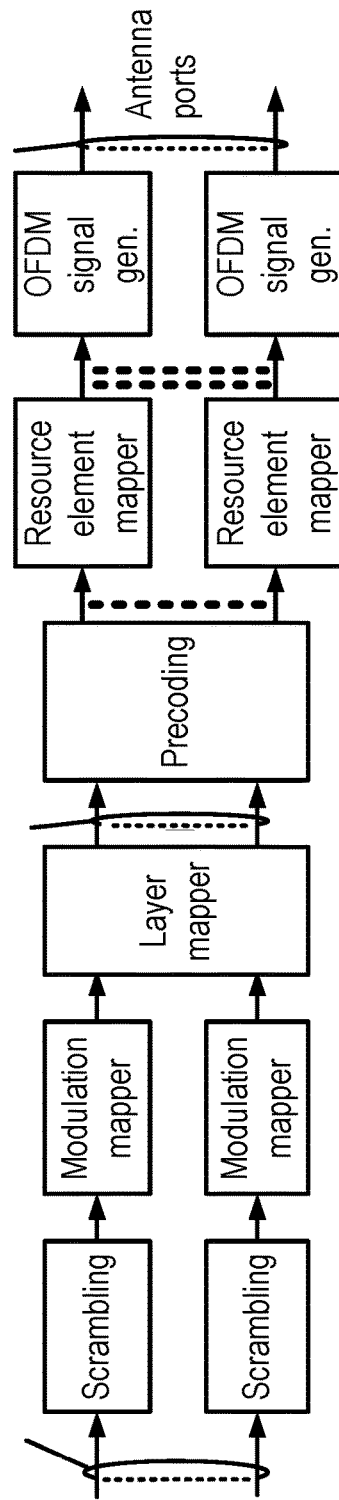
FIG. 5D Example downlink modulation
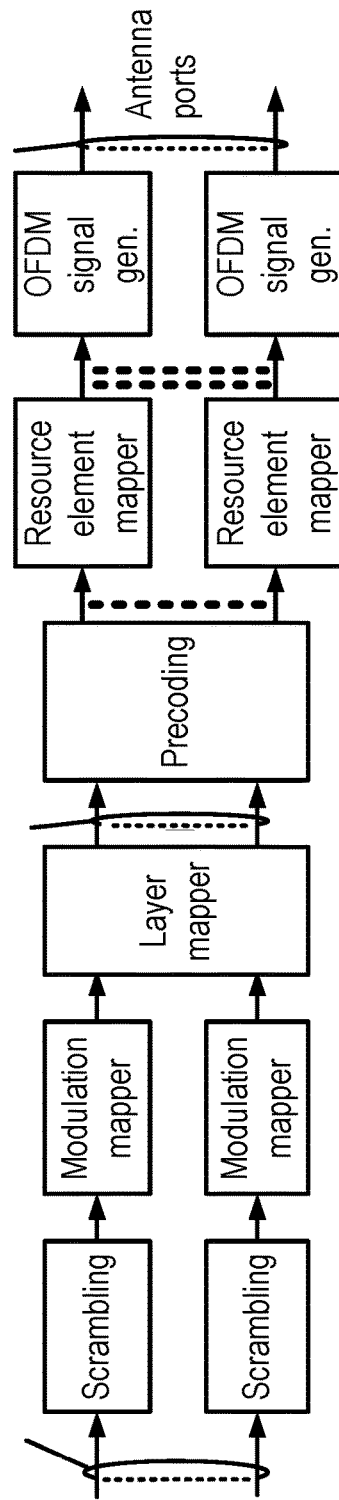
FIG. 5C Example downlink physical channel Dual-Connectivity at eNB FIG. 7 Dual-Connectivity- two MAC entities at UE side Example 1: 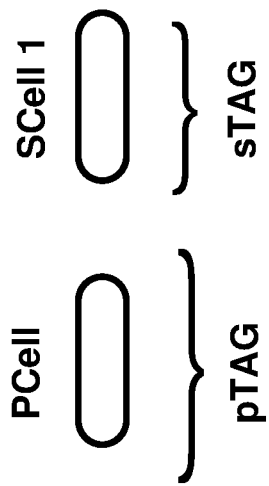
Example 2: 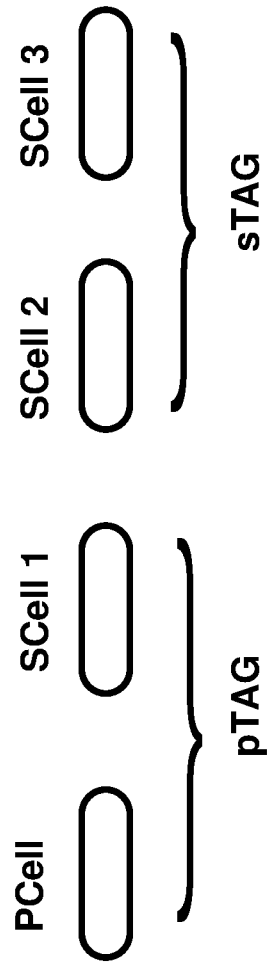
Example 3: 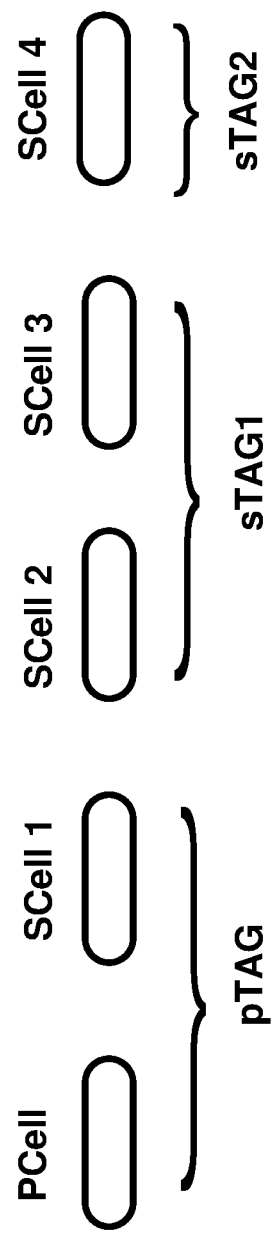
FIG. 8

RESTARTING A DEACTIVATION TIMER OF A SECONDARY CELL IN A WIRELESS NETWORK

CROSS-REFERENCE TO RELATED APPLICATIONS

This application is a continuation of U.S. patent application Ser. No. 17/313,724, filed May 6, 2021, which is a continuation of U.S. patent application Ser. No. 16/432,259, filed Jun. 5, 2019, which is a continuation of U.S. patent application Ser. No. 15/972,466, filed May 7, 2018, which is a continuation of U.S. patent application Ser. No. 15/130,511, filed Apr. 15, 2016, which claims the benefit of U.S. Provisional Application No. 62/148,700, filed Apr. 16, 2015, all of which are hereby incorporated by reference in their entireties.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

DETAILED DESCRIPTION OF EMBODIMENTS

Figure 1:
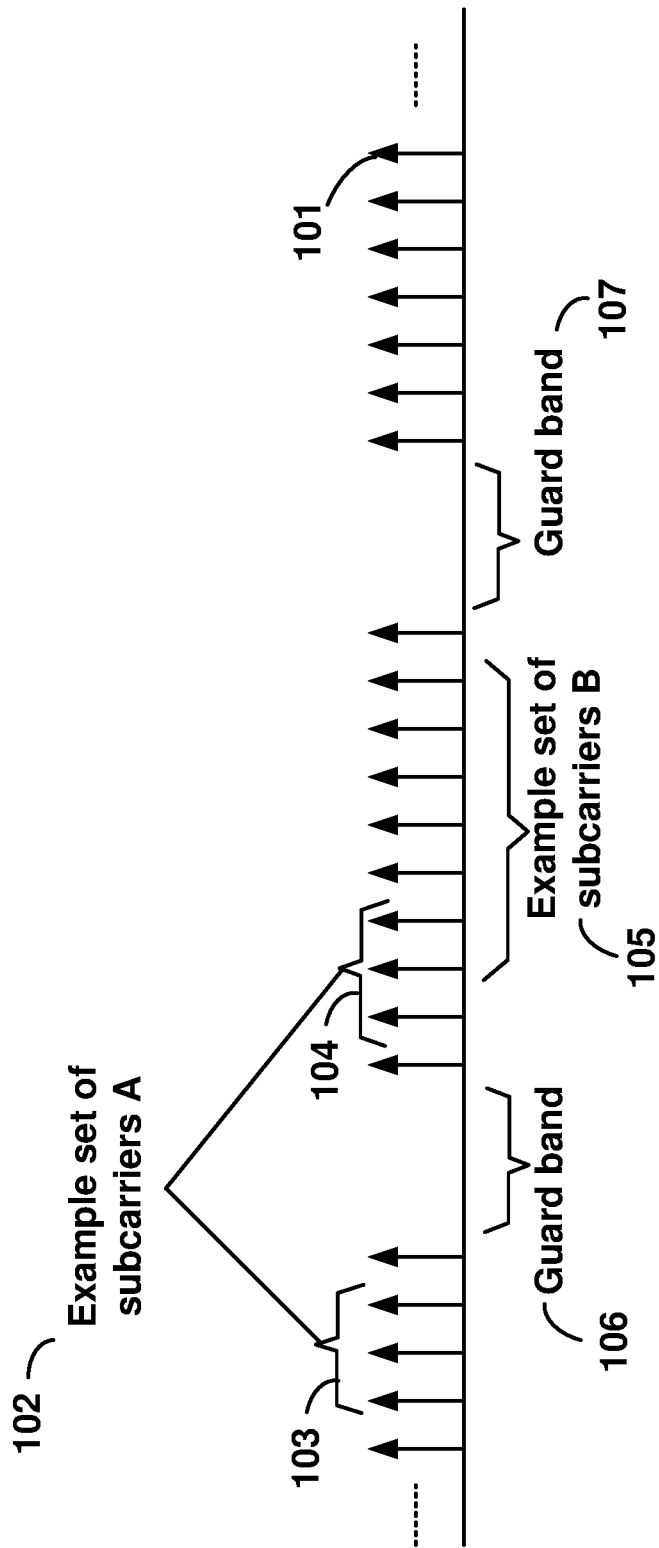
FIG. 1 is a diagram depicting example sets of OFDM subcarriers as per an aspect of an embodiment of the present invention.

Example embodiments of the present invention enable operation of carrier aggregation in a wireless network. Embodiments of the technology disclosed herein may be employed in the technical field of multicarrier communication systems. More particularly, the embodiments of the technology disclosed herein may relate to operation of control signaling in a carrier aggregation.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
information element
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group SeNB secondary evolved node B
STAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
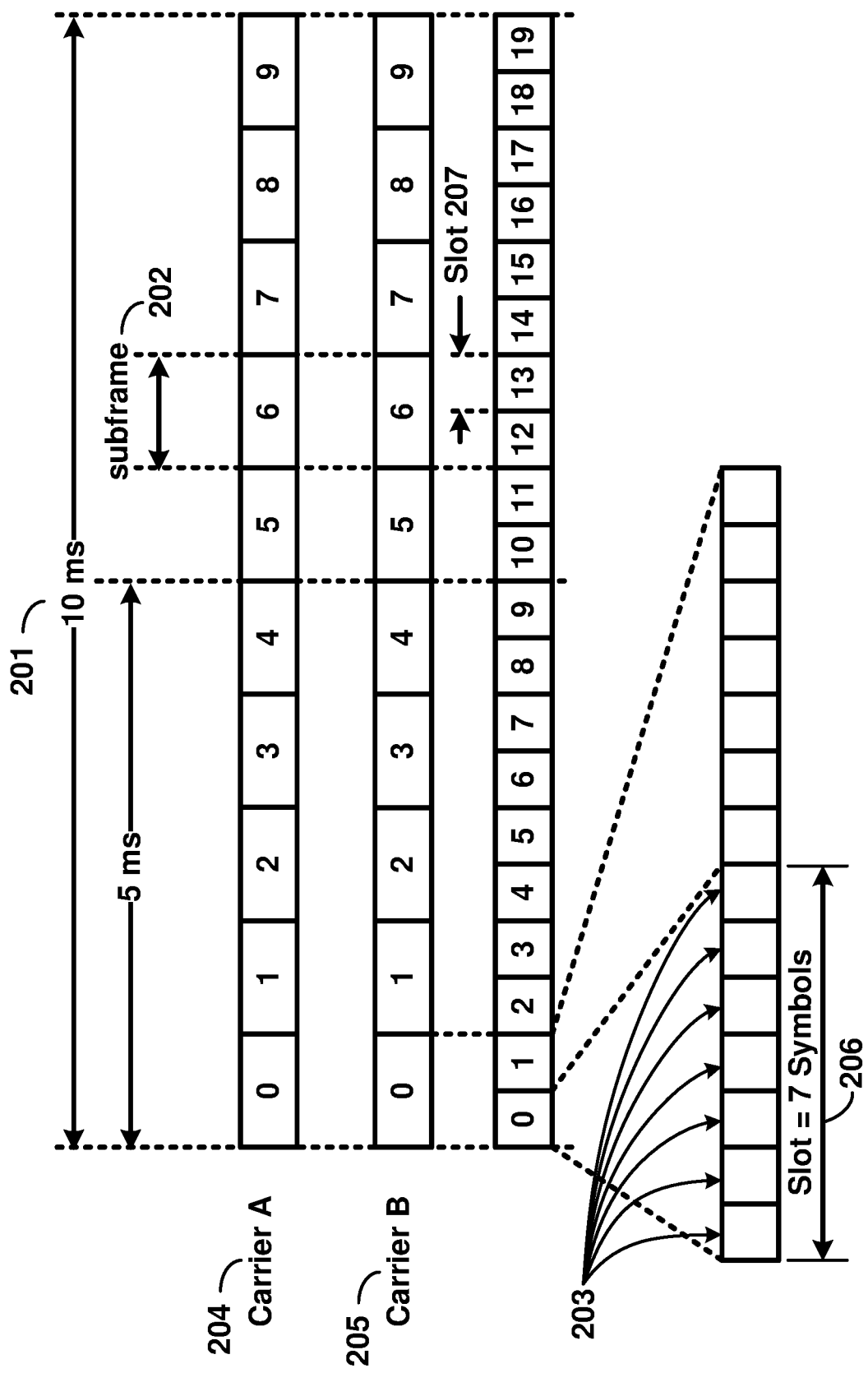
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
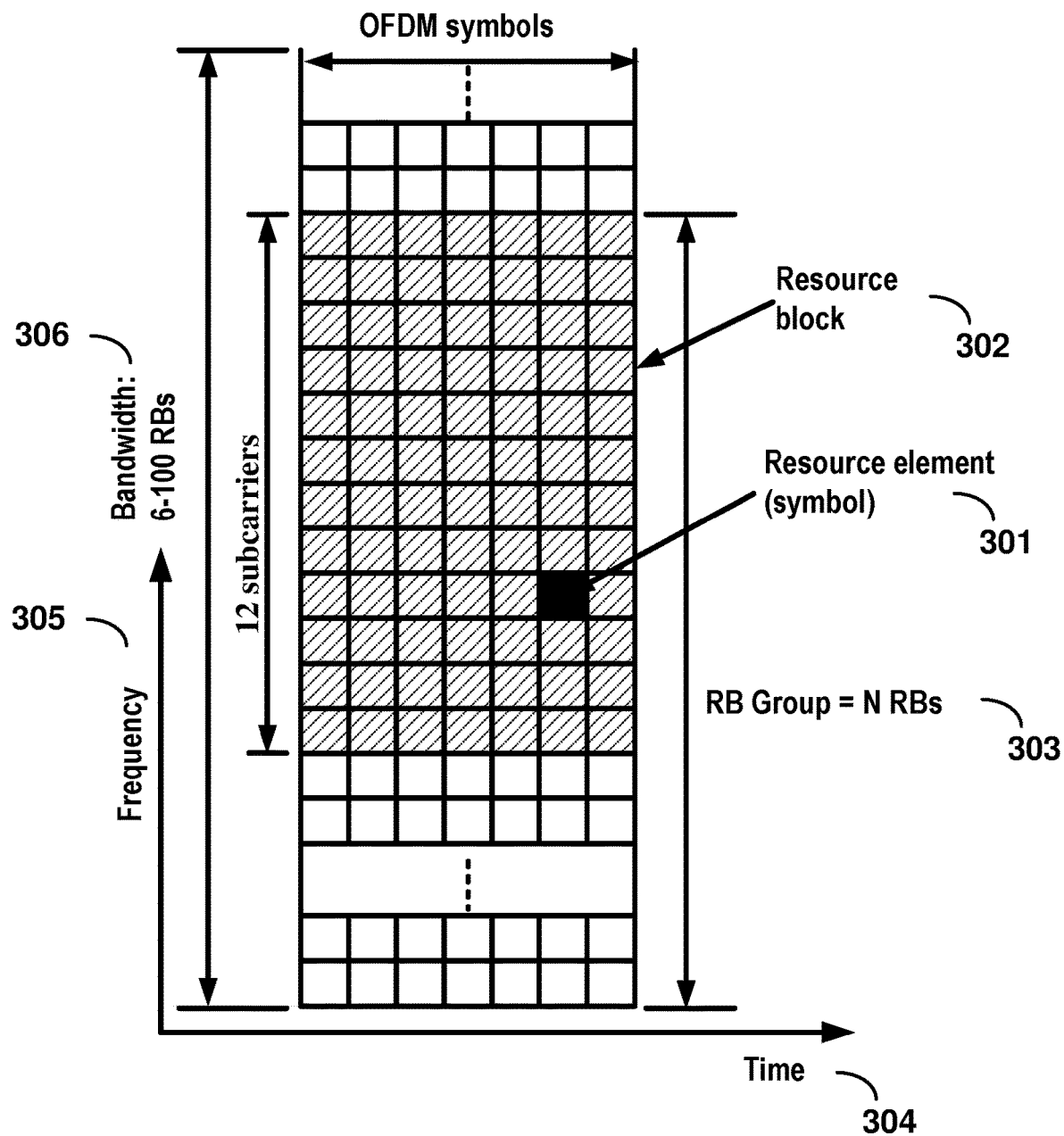
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain SC-FDMA signal for each antenna port, and/or the like.

Example modulation and up-conversion to the carrier frequency of the complex-valued SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
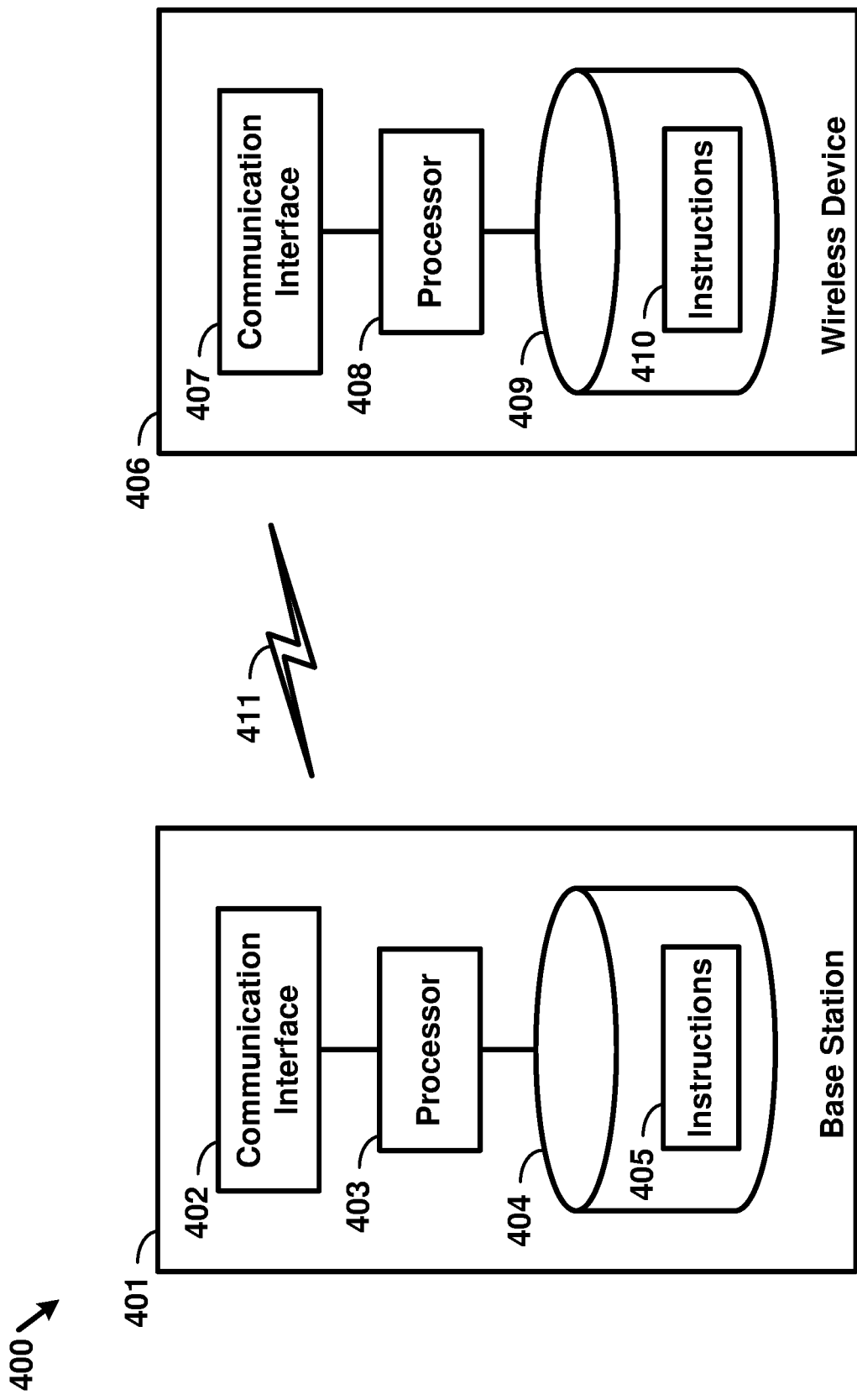
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, an LTE network may include a multitude of base stations, providing a user plane PDCP/RLC/MAC/PHY and control plane (RRC) protocol terminations towards the wireless device. The base station(s) may be interconnected with other base station(s) (e.g. employing an X2 interface). The base stations may also be connected employing, for example, an S1 interface to an EPC. For example, the base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
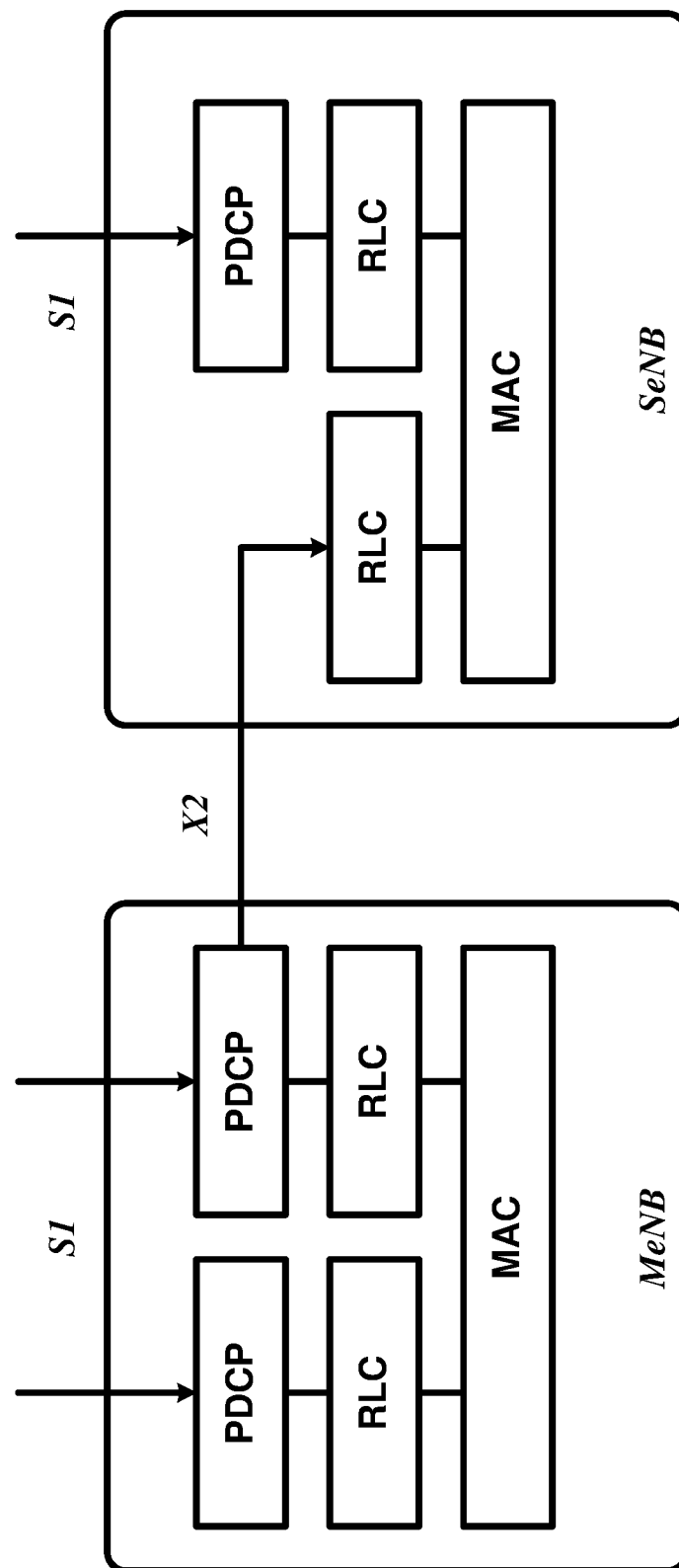
FIG. 6 is an example diagram for a protocol structure with CA and DC as per an aspect of an embodiment of the present invention.
Figure 7:
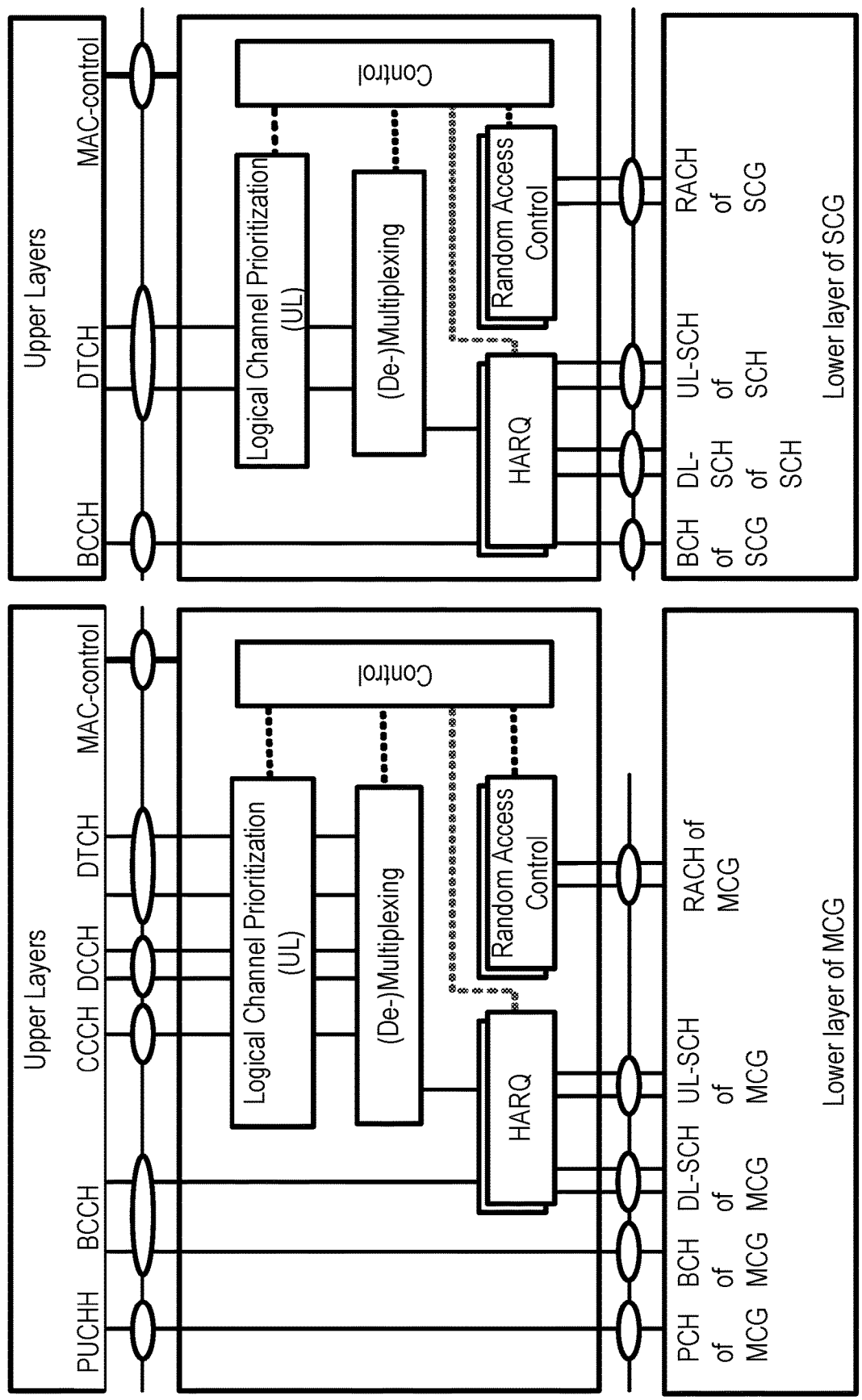
FIG. 7 is an example diagram for a protocol structure with CA and DC as per an aspect of an embodiment of the present invention.

FIG. 6 and FIG. 7 are example diagrams for protocol structure with CA and DC as per an aspect of an embodiment of the present invention. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the invention.

In the case of DC, the UE may be configured with two MAC entities: one MAC entity for MeNB, and one MAC entity for SeNB. In DC, the configured set of serving cells for a UE may comprise of two subsets: the Master Cell Group (MCG) containing the serving cells of the MeNB, and the Secondary Cell Group (SCG) containing the serving cells of the SeNB. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a MeNB may be informed by the UE of a SCG failure type, for split bearer, the DL data transfer over the MeNB is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a MeNB and a SeNB, one or more of the following principles may be applied: the MeNB may maintain the RRM measurement configuration of the UE and may, (e.g., based on received measurement reports or traffic conditions or bearer types), decide to ask a SeNB to provide additional resources (serving cells) for a UE; upon receiving a request from the MeNB, a SeNB may create a container that may result in the configuration of additional serving cells for the UE (or decide that it has no resource available to do so); for UE capability coordination, the MeNB may provide (part of) the AS configuration and the UE capabilities to the SeNB; the MeNB and the SeNB may exchange information about a UE configuration by employing of RRC containers (inter-node messages) carried in X2 messages; the SeNB may initiate a reconfiguration of its existing serving cells (e.g., PUCCH towards the SeNB); the SeNB may decide which cell is the PSCell within the SCG; the MeNB may not change the content of the RRC configuration provided by the SeNB; in the case of a SCG addition and a SCG SCell addition, the MeNB may provide the latest measurement results for the SCG cell(s); both a MeNB and a SeNB may know the SFN and subframe offset of each other by OAM, (e.g., for the purpose of DRX alignment and identification of a measurement gap). In an example, when adding a new SCG SCell, dedicated RRC signalling may be used for sending required system information of the cell as for CA, except for the SFN acquired from a MIB of the PSCell of a SCG.

According to some of the various aspects of embodiments, serving cells having an uplink to which the same time alignment (TA) applies may be grouped in a TA group (TAG). Serving cells in one TAG may use the same timing reference. For a given TAG, user equipment (UE) may use one downlink carrier as a timing reference at a given time. The UE may use a downlink carrier in a TAG as a timing reference for that TAG. For a given TAG, a UE may synchronize uplink subframe and frame transmission timing of uplink carriers belonging to the same TAG. According to some of the various aspects of embodiments, serving cells having an uplink to which the same TA applies may correspond to serving cells hosted by the same receiver. A TA group may comprise at least one serving cell with a configured uplink. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). Carriers within the same TA group may use the same TA value and the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. The operation with one example sTAG is described, and the same operation may be applicable to other sTAGs. The example mechanisms may be applied to configurations with multiple sTAGs.

According to some of the various aspects of embodiments, TA maintenance, pathloss reference handling and a timing reference for a pTAG may follow LTE release 10 principles in the MCG and/or SCG. The UE may need to measure downlink pathloss to calculate uplink transmit power. A pathloss reference may be used for uplink power control and/or transmission of random access preamble(s). UE may measure downlink pathloss using signals received on a pathloss reference cell. For SCell(s) in a pTAG, the choice of a pathloss reference for cells may be selected from and/or be limited to the following two options: a) the downlink SCell linked to an uplink SCell using system information block 2 (SIB2), and b) the downlink pCell. The pathloss reference for SCells in a pTAG may be configurable using RRC message(s) as a part of an SCell initial configuration and/or reconfiguration. According to some of the various aspects of embodiments, a PhysicalConfigDedicatedSCell information element (IE) of an SCell configuration may include a pathloss reference SCell (downlink carrier) for an SCell in a pTAG. The downlink SCell linked to an uplink SCell using system information block 2 (SIB2) may be referred to as the SIB2 linked downlink of the SCell. Different TAGs may operate in different bands. For an uplink carrier in an sTAG, the pathloss reference may be only configurable to the downlink SCell linked to an uplink SCell using the system information block 2 (SIB2) of the SCell.

To obtain initial uplink (UL) time alignment for an sTAG, an eNB may initiate an RA procedure. In an sTAG, a UE may use one of any activated SCells from this sTAG as a timing reference cell. In an example embodiment, the timing reference for SCells in an sTAG may be the SIB2 linked downlink of the SCell on which the preamble for the latest RA procedure was sent. There may be one timing reference and one time alignment timer (TAT) per TA group. A TAT for TAGs may be configured with different values. In a MAC entity, when a TAT associated with a pTAG expires: all TATs may be considered as expired, the UE may flush HARQ buffers of serving cells, the UE may clear any configured downlink assignment/uplink grants, and the RRC in the UE may release PUCCH/SRS for all configured serving cells. When the pTAG TAT is not running, an sTAG TAT may not be running. When the TAT associated with an sTAG expires: a) SRS transmissions may be stopped on the corresponding SCells, b) SRS RRC configuration may be released, c) CSI reporting configuration for corresponding SCells may be maintained, and/or d) the MAC in the UE may flush the uplink HARQ buffers of the corresponding SCells.

An eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to STAG(s).

Figure 9:
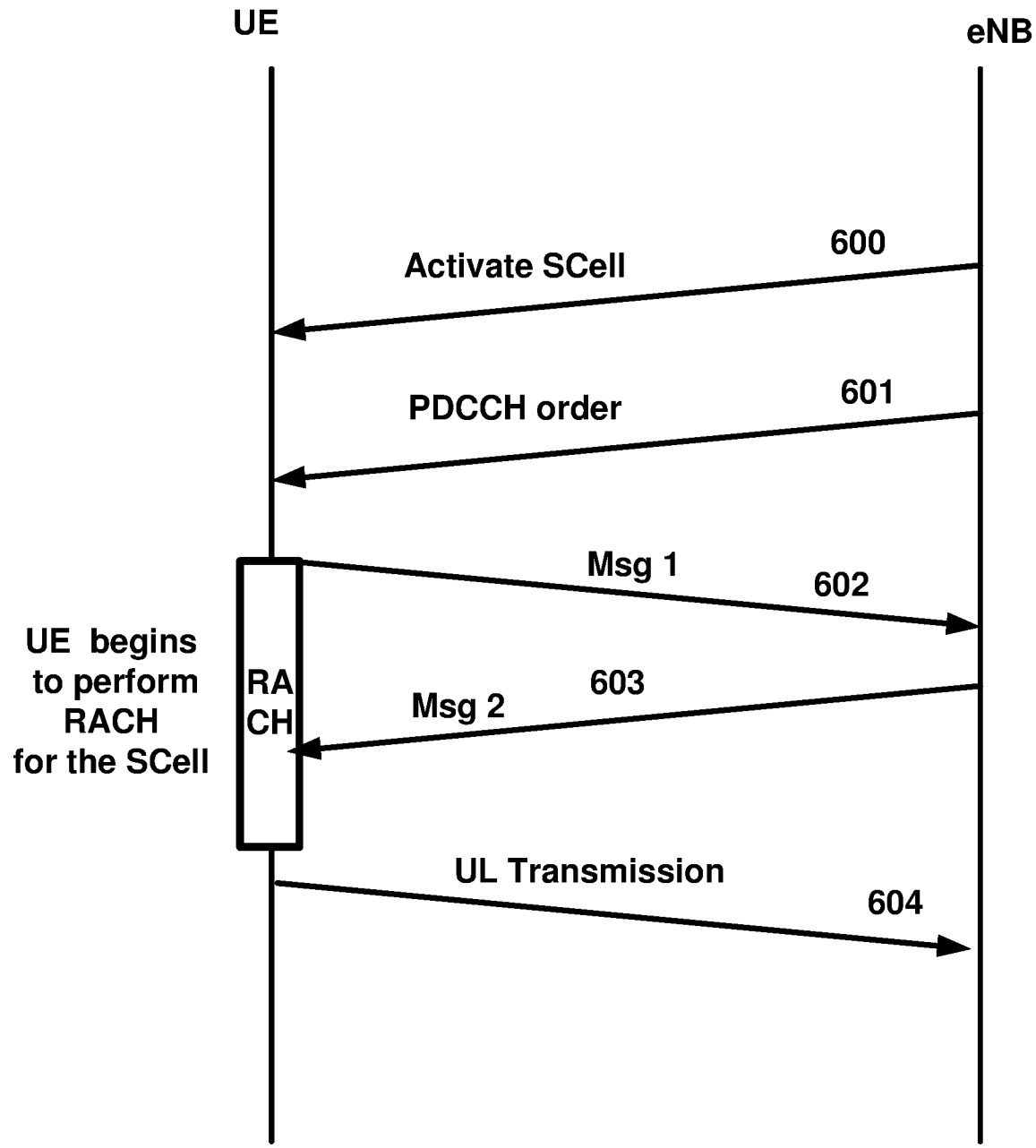
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to the RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may always be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

Figure 10:
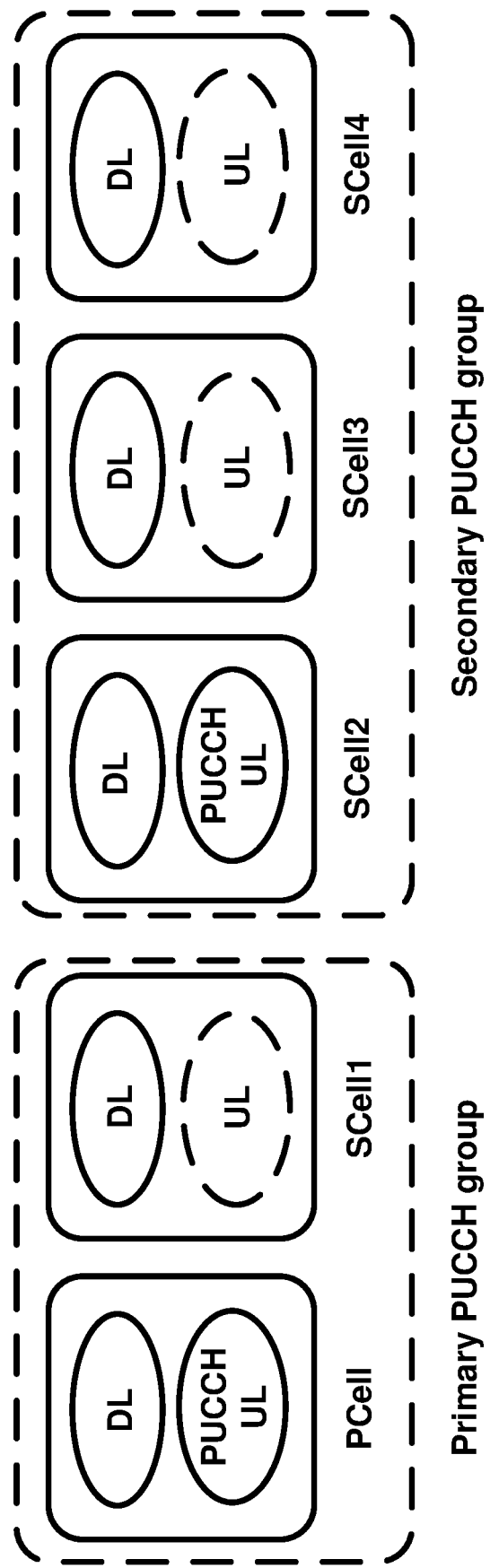
FIG. 10 is an example grouping of cells into PUCCH groups as per an aspect of an embodiment of the present invention.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. FIG. 10 is an example grouping of cells into PUCCH groups as per an aspect of an embodiment of the present invention. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In Release-12, a PUCCH can be configured on a PCell and/or a PSCell, but cannot be configured on other SCells. In an example embodiment, a UE may transmit a message indicating that the UE supports PUCCH configuration on a PCell and SCell. Such an indication may be separate from an indication of dual connectivity support by the UE. In an example embodiment, a UE may support both DC and PUCCH groups. In an example embodiment, either DC or PUCCH groups may be configured, but not both. In another example embodiment, more complicated configurations comprising both DC and PUCCH groups may be supported.

When a UE is capable of configuring PUCCH groups, and if a UE indicates that it supports simultaneous PUCCH/PUSCH transmission capability, it may imply that the UE supports simultaneous PUCCH/PUSCH transmission on both PCell and SCell. When multiple PUCCH groups are configured, a PUCCH may be configured or not configured with simultaneous PUCCH/PUSCH transmission.

In an example embodiment, PUCCH transmission to a base station on two serving cells may be realized as shown in FIG. 10. A first group of cells may employ a PUCCH on the PCell and may be called PUCCH group 1 or a primary PUCCH group. A second group of cells may employ a PUCCH on an SCell and may be called PUCCH group 2 or a secondary PUCCH group. One, two or more PUCCH groups may be configured. In an example, cells may be grouped into two PUCCH groups, and each PUCCH group may include a cell with PUCCH resources. A PCell may provide PUCCH resources for the primary PUCCH group and an SCell in the secondary PUCCH group may provide PUCCH resources for the cells in the secondary PUCCH group. In an example embodiment, no cross-carrier scheduling between cells in different PUCCH groups may be configured. When cross-carrier scheduling between cells in different PUCCH groups is not configured, ACK/NACK on PHICH channel may be limited within a PUCCH group. Both downlink and uplink scheduling activity may be separate between cells belonging to different PUCCH groups.

A PUCCH on an SCell may carry HARQ-ACK and CSI information. A PCell may be configured with PUCCH resources. In an example embodiment, RRC parameters for an SCell PUCCH Power Control for a PUCCH on an SCell may be different from those of a PCell PUCCH. A Transmit Power Control command for a PUCCH on an SCell may be transmitted in DCI(s) on the SCell carrying the PUCCH.

UE procedures on a PUCCH transmission may be different and/or independent between PUCCH groups. For example, determination of DL HARQ-ACK timing, PUCCH resource determination for HARQ-ACK and/or CSI, Higher-layer configuration of simultaneous HARQ-ACK+CSI on a PUCCH, Higher-layer configuration of simultaneous HARQ-ACK+SRS in one subframe may be configured differently for a PUCCH PCell and a PUCCH SCell.

A PUCCH group may be a group of serving cells configured by a RRC and use the same serving cell in the group for transmission of a PUCCH. A Primary PUCCH group may be a PUCCH group containing a PCell. A secondary PUCCH group may be a PUCCH cell group not containing the PCell. In an example embodiment, an SCell may belong to one PUCCH group. When one SCell belongs to a PUCCH group, ACK/NACK or CSI for that SCell may be transmitted over the PUCCH in that PUCCH group (over PUCCH SCell or PUCCH PCell). A PUCCH on an SCell may reduce the PUCCH load on the PCell. A PUCCH SCell may be employed for UCI transmission of SCells in the corresponding PUCCH group.

In an example embodiment, a flexible PUCCH configuration in which control signalling is sent on one, two or more PUCCHs may be possible. Beside the PCell, it may be possible to configure a selected number of SCells for PUCCH transmission (herein called PUCCH SCells). Control signalling information conveyed in a certain PUCCH SCell may be related to a set of SCells in a corresponding PUCCH group that are configured by the network via RRC signalling.

PUCCH control signalling carried by a PUCCH channel may be distributed between a PCell and SCells for offloading or robustness purposes. By enabling a PUCCH in an SCell, it may be possible to distribute the overall CSI reports for a given UE between a PCell and a selected number of SCells (e.g. PUCCH SCells), thereby limiting PUCCH CSI resource consumption by a given UE on a certain cell. It may be possible to map CSI reports for a certain SCell to a selected PUCCH SCell. An SCell may be assigned a certain periodicity and time-offset for transmission of control information. Periodic CSI for a serving cell may be mapped on a PUCCH (on the PCell or on a PUCCH-SCell) via RRC signalling. The possibility of distributing CSI reports, HARQ feedbacks, and/or Scheduling Requests across PUCCH SCells may provide flexibility and capacity improvements. HARQ feedback for a serving cell may be mapped on a PUCCH (on the PCell or on a PUCCH SCell) via RRC signalling.

In example embodiments, PUCCH transmission may be configured on a PCell, as well as one SCell in CA. An SCell PUCCH may be realized using the concept of PUCCH groups, where aggregated cells are grouped into two or more PUCCH groups. One cell from a PUCCH group may be configured to carry a PUCCH. More than 5 carriers may be configured. In the example embodiments, up to n carriers may be aggregated. For example, n may be 16, 32, or 64. Some CCs may have non-backward compatible configurations supporting only advanced UEs (e.g. support licensed assisted access SCells). In an example embodiment, one SCell PUCCH (e.g. two PUCCH groups) may be supported. In another example embodiment, a PUCCH group concept with multiple (more than one) SCells carrying PUCCH may be employed (e.g., there can be more than two PUCCH groups).

In an example embodiment, a given PUCCH group may not comprise serving cells of both MCG and SCG. One of the PUCCHs may be configured on the PCell. In an example embodiment, PUCCH mapping of serving cells may be configured by RRC messages. In an example embodiment, a maximum value of an SCellIndex and a ServCellIndex may be 31 (ranging from 0 to 31). In an example, a maximum value of stag-Id may be 3. The CIF for a scheduled cell may be configured explicitly. A PUCCH SCell may be configured by giving a PUCCH configuration for an SCell. A HARQ feedback and CSI report of a PUCCH SCell may be sent on the PUCCH of that PUCCH SCell. The HARQ feedback and CSI report of a SCell may sent on a PUCCH of a PCell if no PUCCH SCell is signalled for that SCell. The HARQ feedback and CSI report of an SCell may be sent on the PUCCH of one PUCCH SCell; hence they may not be sent on the PUCCH of different PUCCH SCell. The UE may report a Type 2 PH for serving cells configured with a PUCCH. In an example embodiment, a MAC activation/deactivation may be supported for a PUCCH SCell. An eNB may manage the activation/deactivation status for SCells. A newly added PUCCH SCell may be initially deactivated.

Figure 11:
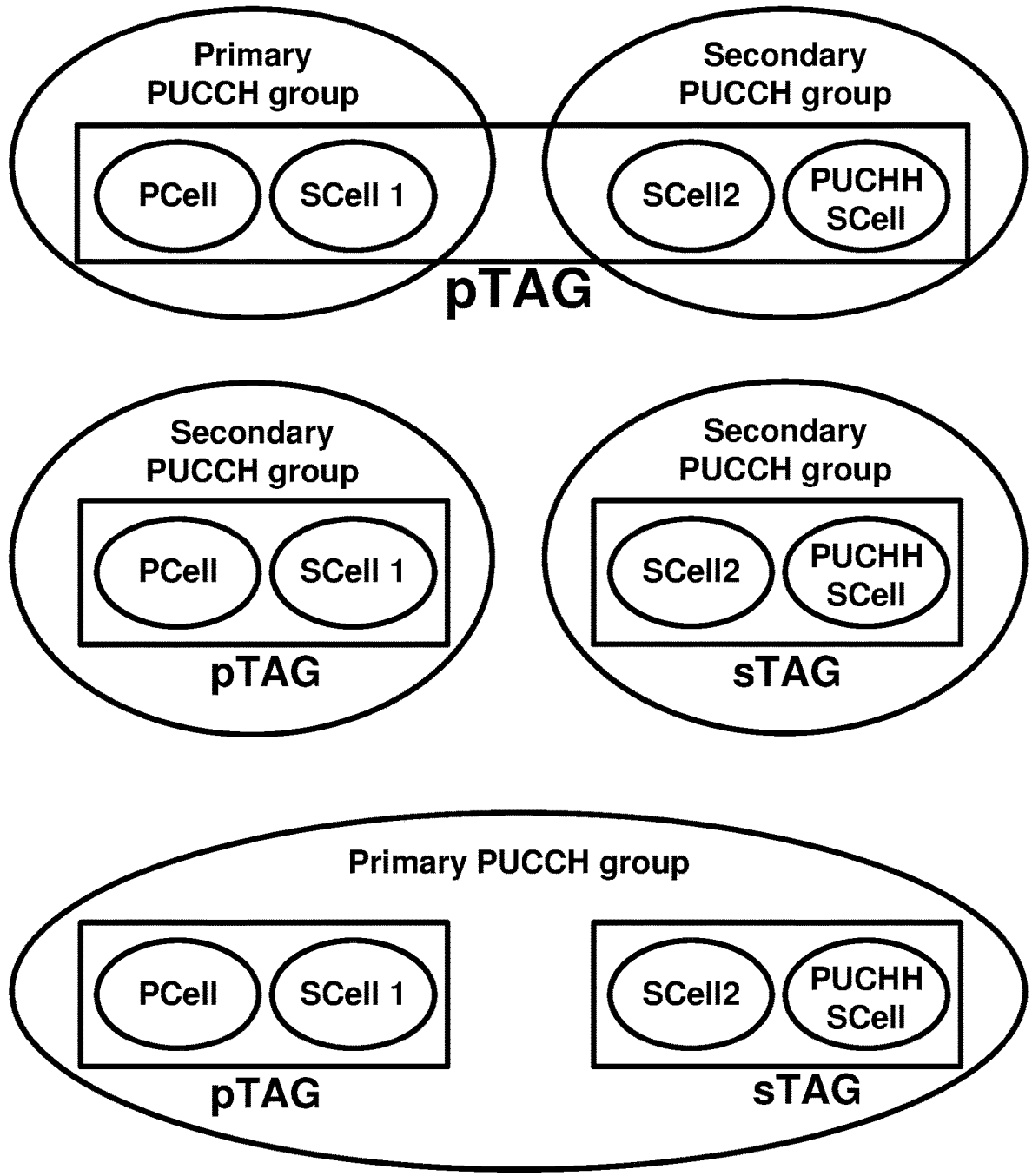
FIG. 11 illustrates example groupings of cells into one or more PUCCH groups and one or more TAGs as per an aspect of an embodiment of the present invention.
Figure 12:
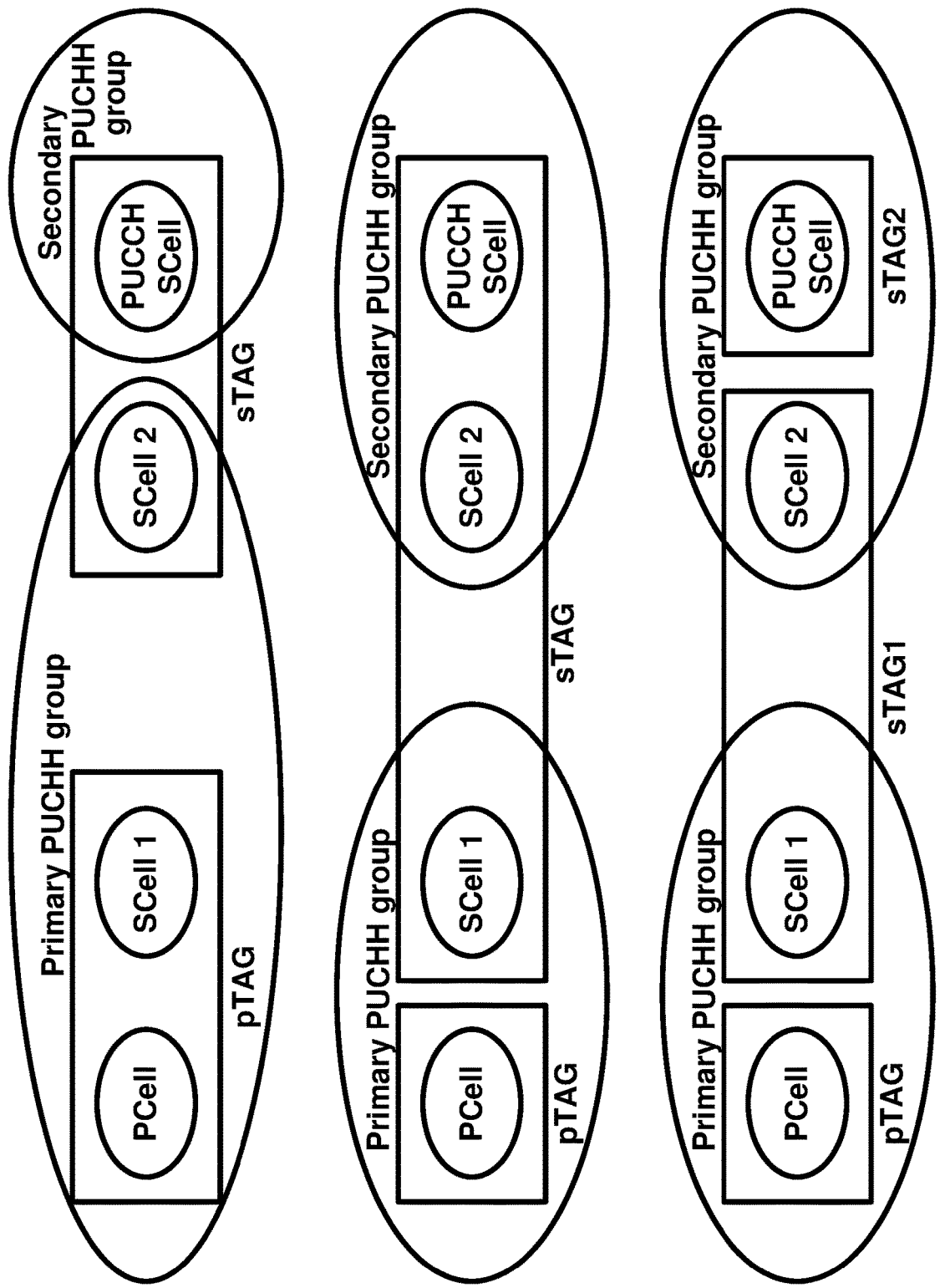
FIG. 12 illustrates example groupings of cells into one or more PUCCH groups and one or more TAGs as per an aspect of an embodiment of the present invention.

In an example embodiment, independent configuration of PUCCH groups and TAGs may be supported. FIG. 11 and FIG. 12 show example configurations of TAGs and PUCCH groups. For example, one TAG may contain multiple serving cells with a PUCCH. For example, each TAG may only comprise cells of one PUCCH group. For example, a TAG may comprise the serving cells (without a PUCCH) which belong to different PUCCH groups.

There may not be a one-to-one mapping between TAGs and PUCCH groups. For example, in a configuration, a PUCCH SCell may belong to primary TAG. In an example implementation, the serving cells of one PUCCH group may be in different TAGs and serving cells of one TAG may be in different PUCCH groups. Configuration of PUCCH groups and TAGs may be left to eNB implementation. In another example implementation, restriction(s) on the configuration of a PUCCH cell may be specified. For example, in an example embodiment, cells in a given PUCCH group may belong to the same TAG. In an example, an sTAG may only comprise cells of one PUCCH group. In an example, one-to-one mapping between TAGs and PUCCH groups may be implemented. In implementation, cell configurations may be limited to some of the examples. In other implementations, some or all the below configurations may be allowed.

In an example embodiment, for an SCell in a pTAG, the timing reference may be a PCell. For an SCell in an sTAG, the timing reference may be any activated SCell in the sTAG. For an SCell (configured with PUCCH or not) in a pTAG, a pathloss reference may be configured to be a PCell or an SIB-2 linked SCell. For an SCell in a sTAG, the pathloss reference may be the SIB-2 linked SCell. When a TAT associated with a pTAG is expired, the TAT associated with sTAGs may be considered as expired. When a TAT of an sTAG containing PUCCH SCell expires, the MAC may indicate to an RRC to release PUCCH resource for the PUCCH group. When the TAT of an sTAG containing a PUCCH SCell is not running, the uplink transmission (PUSCH) for SCells in the secondary PUCCH group not belonging to the sTAG including the PUCCH SCell may not be impacted. The TAT expiry of an sTAG containing a PUCCH SCell may not trigger TAT expiry of other TAGs to which other SCells in the same PUCCH group belong. When the TAT associated with sTAG not containing a PUCCH SCell is not running, the wireless device may stop the uplink transmission for the SCell in the sTAG and may not impact other TAGs.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

Example embodiments of the invention may enable operation of multiple PUCCH groups. Other example embodiments may comprise a non-transitory tangible computer readable media comprising instructions executable by one or more processors to cause operation of PUCCH groups. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of PUCCH groups. The device may include processors, memory, interfaces, and/or the like. Other example embodiments may comprise communication networks comprising devices such as base stations, wireless devices (or user equipment: UE), servers, switches, antennas, and/or the like. In an example embodiment one or more TAGs may be configured along with PUCCH group configuration.

Figure 13:
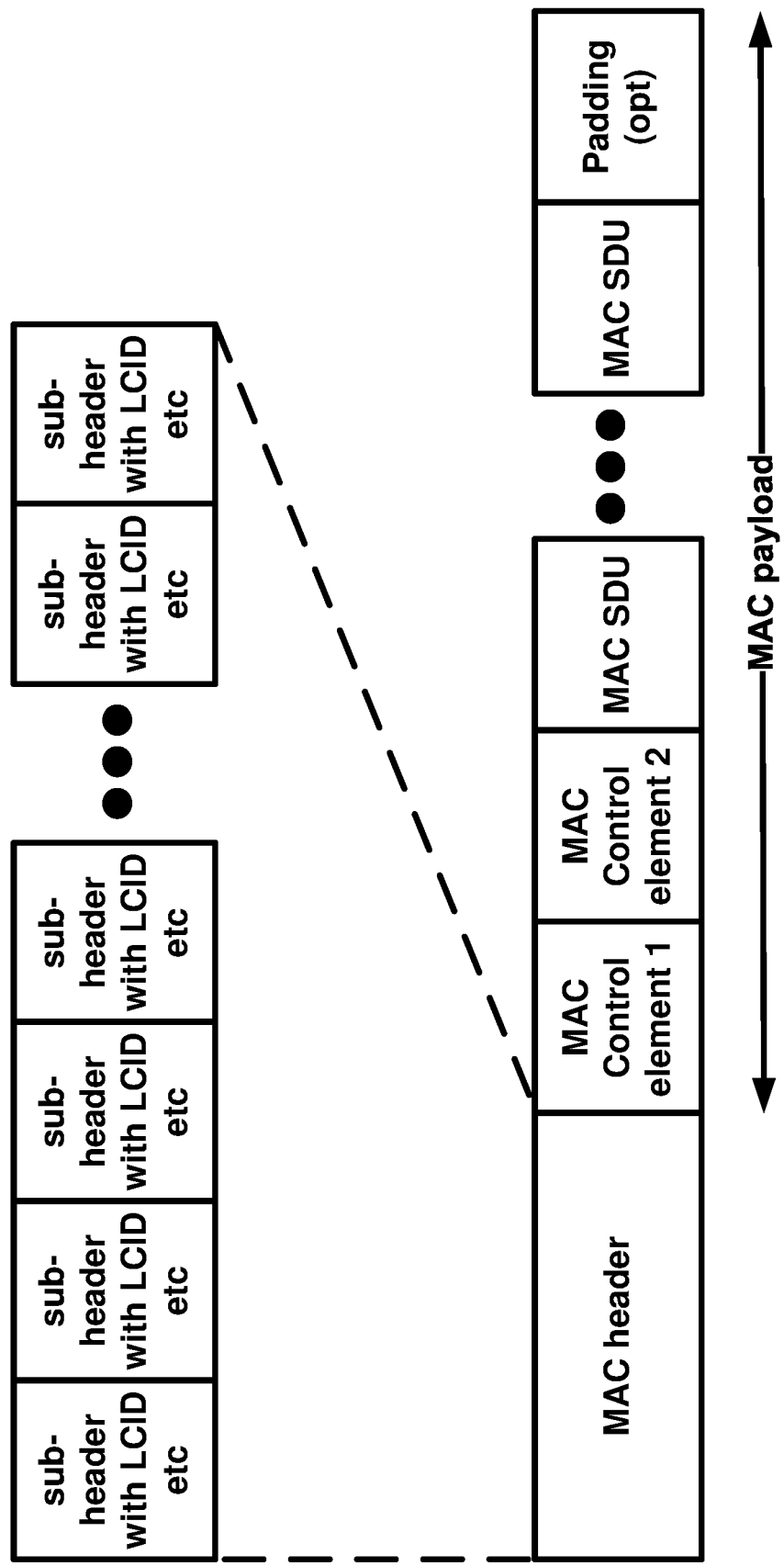
FIG. 13 is an example MAC PDU as per an aspect of an embodiment of the present invention.

FIG. 13 is an example MAC PDU as per an aspect of an embodiment of the present invention. In an example embodiment, a MAC PDU may comprise of a MAC header, zero or more MAC Service Data Units (MAC SDU), zero or more MAC control elements, and optionally padding. The MAC header and the MAC SDUs may be of variable sizes. A MAC PDU header may comprise one or more MAC PDU subheaders. A subheader may correspond to either a MAC SDU, a MAC control element or padding. A MAC PDU subheader may comprise header fields R, F2, E, LCID, F, and/or L. The last subheader in the MAC PDU and subheaders for fixed sized MAC control elements may comprise the four header fields R, F2, E, and/or LCID. A MAC PDU subheader corresponding to padding may comprise the four header fields R, F2, E, and/or LCID.

In an example embodiment, LCID or Logical Channel ID field may identify the logical channel instance of the corresponding MAC SDU or the type of the corresponding MAC control element or padding. There may be one LCID field for a MAC SDU, MAC control element or padding included in the MAC PDU. In addition to that, one or two additional LCID fields may be included in the MAC PDU when single-byte or two-byte padding is required but cannot be achieved by padding at the end of the MAC PDU. The LCID field size may be, e.g. 5 bits. L or the Length field may indicate the length of the corresponding MAC SDU or variable-sized MAC control element in bytes. There may be one L field per MAC PDU subheader except for the last subheader and subheaders corresponding to fixed-sized MAC control elements. The size of the L field may be indicated by the F field and F2 field. The F or the Format field may indicate the size of the Length field. There may be one F field per MAC PDU subheader except for the last subheader and subheaders corresponding to fixed-sized MAC control elements and expect for when F2 is set to 1. The size of the F field may be 1 bit. In an example, if the F field is included, and/or if the size of the MAC SDU or variable-sized MAC control element is less than 128 bytes, the value of the F field is set to 0, otherwise it is set to 1. The F2 or the Format2 field may indicate the size of the Length field. There may be one F2 field per MAC PDU subheader. The size of the F2 field may be 1 bit. In an example, if the size of the MAC SDU or variable-sized MAC control element is larger than 32767 bytes and if the corresponding subheader is not the last subheader, the value of the F2 field may be set to 1, otherwise it is set to 0. The E or the Extension field may be a flag indicating if more fields are present in the MAC header or not. The E field may be set to "1" to indicate another set of at least R/F2/E/LCID fields. The E field may be set to "0" to indicate that either a MAC SDU, a MAC control element or padding starts at the next byte. R or reserved bit, set to "0".

MAC PDU subheaders may have the same order as the corresponding MAC SDUs, MAC control elements and padding. MAC control elements may be placed before any MAC SDU. Padding may occur at the end of the MAC PDU, except when single-byte or two-byte padding is required. Padding may have any value and the MAC entity may ignore it. When padding is performed at the end of the MAC PDU, zero or more padding bytes may be allowed. When single-byte or two-byte padding is required, one or two MAC PDU subheaders corresponding to padding may be placed at the beginning of the MAC PDU before any other MAC PDU subheader. In an example, a maximum of one MAC PDU may be transmitted per TB per MAC entity, a maximum of one MCH MAC PDU can be transmitted per TTI.

At least one RRC message may provide configuration parameters for at least one cell and configuration parameters for PUCCH groups. The information elements in one or more RRC messages may provide mapping between configured cells and PUCCH SCells. Cells may be grouped into a plurality of cell groups and a cell may be assigned to one of the configured PUCCH groups. There may be a one-to-one relationship between PUCCH groups and cells with configured PUCCH resources. At least one RRC message may provide mapping between an SCell and a PUCCH group, and PUCCH configuration on PUCCH SCell.

System information (common parameters) for an SCell may be carried in a RadioResourceConfigCommonSCell in a dedicated RRC message. Some of the PUCCH related information may be included in common information of an SCell (e.g. in the RadioResourceConfigCommonSCell). Dedicated configuration parameters of SCell and PUCCH resources may be configured by dedicated RRC signaling using, for example, RadioResourceConfigDedicatedSCell.

The IE PUCCH-ConfigCommon and IE PUCCH-ConfigDedicated may be used to specify the common and the UE specific PUCCH configuration respectively.

In an example, PUCCH-ConfigCommon may include: deltaPUCCH-Shift: ENUMERATED {ds1, ds2, ds3}; nRB-CQI: INTEGER (0 . . . 98); nCS-AN: INTEGER (0 . . . 7); and/or n1PUCCH-AN: INTEGER (0 . . . 2047). The parameter deltaPUCCH-Shift ($\Delta_{shift}^{PUCCH}$) shift nRB-CQI ($N_{RB}^{(2)}$), nCS-An ($N_{cs}^{(1)}$), and n1PUCCH-AN ($N_{PUCCH}^{(1)}$) may be physical layer parameters of PUCCH.

PUCCH-ConfigDedicated may be employed. PUCCH-ConfigDedicated may include: ackNackRepetition CHOICE {release: NULL, setup: SEQUENCE {repetitionFactor: ENUMERATED {n2, n4, n6, spare1}, n1PUCCH-AN-Rep: INTEGER (0 . . . 2047)}}, tdd-AckNackFeedbackMode: ENUMERATED {bundling, multiplexing} OPTIONAL}. ackNackRepetitionj parameter indicates whether ACK/NACK repetition is configured. n2 corresponds to repetition factor 2, n4 to 4 for repetitionFactor parameter (NANRep) n1PUCCH-AN-Rep parameter may be nPUCCH. ANRep for antenna port P0 and for antenna port P1. dd-AckNackFeedbackMode parameter may indicate one of the TDD ACK/NACK feedback modes used. The value bundling may correspond to use of ACK/NACK bundling whereas, the value multiplexing may correspond to ACK/NACK multiplexing. The same value may apply to both ACK/NACK feedback modes on PUCCH as well as on PUSCH.

The parameter PUCCH-ConfigDedicated may include simultaneous PUCCH-PUSCH parameter indicating whether simultaneous PUCCH and PUSCH transmissions is configured. An E-UTRAN may configure this field for the PCell when the nonContiguousUL-RA-WithinCC-Info is set to supported in the band on which PCell is configured. The E-UTRAN may configure this field for the PSCell when the nonContiguousUL-RA-WithinCC-Info is set to supported in the band on which PSCell is configured. The E-UTRAN may configure this field for the PUCCH SCell when the nonContiguousUL-RA-WithinCC-Info is set to supported in the band on which PUCCH SCell is configured.

A UE may transmit radio capabilities to an eNB to indicate whether UE support the configuration of PUCCH groups. The simultaneous PUCCH-PUSCH in the UE capability message may be applied to both a PCell and an SCell. Simultaneous PUCCH+PUSCH may be configured separately (using separate IEs) for a PCell and a PUCCH SCell. For example, a PCell and a PUCCH SCell may have different or the same configurations related to simultaneous PUCCH+PUSCH.

The eNB may select the PUCCH SCell among current SCells or candidate SCells considering cell loading, carrier quality (e.g. using measurement reports), carrier configuration, and/or other parameters. From a functionality perspective, a PUCCH Cell group management procedure may include a PUCCH Cell group addition, a PUCCH cell group release, a PUCCH cell group change and/or a PUCCH cell group reconfiguration. The PUCCH cell group addition procedure may be used to add a secondary PUCCH cell group (e.g., to add PUCCH SCell and one or more SCells in the secondary PUCCH cell group). In an example embodiment, cells may be released and added employing one or more RRC messages. In another example embodiment, cells may be released employing a first RRC message and then added employing a second RRC messages.

SCells including PUCCH SCell may be in a deactivated state when they are configured. A PUCCH SCell may be activated after an RRC configuration procedure by an activation MAC CE. An eNB may transmit a MAC CE activation command to a UE. The UE may activate an SCell in response to receiving the MAC CE activation command.

In example embodiments, a timer is running once it is started, until it is stopped or until it expires; otherwise it may not be running. A timer can be started if it is not running or restarted if it is running. For example, a timer may be started or restarted from its initial value.

In the example embodiments, up to n carriers may be aggregated. For example, n may be 16, 32, or 64. The schemes for self-scheduling and cross-carrier scheduling may be supported. The corresponding UL/DL control signaling is needed to be enhanced to support aggregation of a large number of carriers. Example embodiments for up to 32 carriers are presented. Example embodiments may be extended to support higher or lower number of carriers. For self-carrier scheduling, DL control signaling for Rel-10/11/12 carrier aggregation (CA) may be reused to support scheduling up to 32 component carriers.

LTE-A R-12 supports configuration of up to 5 serving cells. A cell is identified by a serving cell index (identifier). Cross-carrier scheduling in Rel-12 is supported by a carrier indication field (CIF) of 3 bits in DL/UL DCI formats to indicate a serving cell with DL/UL data transmission among 5 cells. The DCI transmitted in a scheduling cell includes a CIF field. The CIF field indicates the serving cell index (identifier) of the scheduled cell. The CIF in the DCI employs 3 bits. The CIF has a length of 3 bits and is a number smaller than 8. Serving cell index (identifier) in R-12 employs 3 bits and is a number smaller than 8. In R-12, each of the CIF and Serving cell index (identifier) is encoded employing 3 bits.

In R-13 and beyond, up to 32 cells may be supported. Identifying a serving cell when up to 32 cells can be configured may require at least 5 bits. In an example embodiment, a serving cell identifier (index) may employ five bits and be a number smaller than 32. In an example embodiment, a serving cell identifier may employ five bits, e.g. 2 bits of group ID, and 3 bits of cell ID. Various example encoding mechanisms may be employed to identify a serving cell among 32 serving cells. A serving cell among up to 32 serving cells may be identified employing a serving cell identifier of at least five bits.

In order to support cross-carrier scheduling and PUCCH transmission for CA with up to 32 serving cells, 2 additional bits can be added to the CIF for UE-specific DL/UL DCI formats to support full flexibility for cross-carrier scheduling. The capacity of PUCCH can be increased to support up to 32 carriers. An increase of the CIF size from 3 bits to 5 bits may introduce an increase in the number of DL/UL DCI format size (length in bits) that a UE needs to monitor. If the CIF is extended to 5 bits in the DCI signal, then up to 32 carriers may be scheduled by one scheduling carrier. An eNB may flexibly configure the scheduling relationship between the component carriers. This approach may introduce more cost on DCI overhead. The new CIF size of five bits may increase the DCI size to be supported by a UE and may result in more DCI size padding. There is a need to maintain the DCI and/or CIF size, when the number of configured cells increases, e.g. up to 32 cells.

In an example embodiment, the PUCCH capacity of the primary cell may be increased to support up to 32 carriers. This may be technically possible, but may reduce available resources for uplink data transmission on the primary carrier. There is a need to provide additional PUCCH capacity on other serving cells in addition to the PCell when a large number of cells are configured.

In Rel-10, cross carrier scheduling is supported for UE specific search space for SCells. Since maximum of 5 carriers may be configured for one UE, maximum of 4 carriers may be cross scheduled on other than the scheduling carrier like PCell. The search space for a cross scheduled carrier may be determined by the serving cell index. With the increase of number of carriers, 3 bits CIF field in the DCI may not be enough to indicate the carrier index of cross scheduled carriers. 3 OFDM symbols for PDCCH region or ePDCCH resources may not be enough to cross-carrier schedule so many carriers. Example embodiments of the invention may provide solutions to these issues.

In case the number of possible aggregated cells is increased, full flexibility in cross-CC scheduling among a maximum of 32 cells may not be needed. An example embodiment may maintain the Rel-12 CIF size and limit cross-carrier scheduling from a serving cell to another serving cell in a group of cells. This is a cross-carrier scheduling group with at most 8 cells. Taking into account the number of both scheduled and scheduling cells, and the number of cells in a cell group, an eNB may divide cells into cross-carrier scheduling groups (or subgroups) and then may configure cross-carrier scheduling between cells within a cross-carrier scheduling group (or subgroup).

In example embodiments, a PUCCH cell grouping may be introduced to resolve some issues related limited PUCCH capacity on PCell. In example embodiments, a cross-carrier scheduling cell grouping may be introduced to resolve some of issues related CIF size and cross carrier scheduling. In an example implementation, PUCCH grouping may be perform without grouping the cells into cross-carrier scheduling groups. In an example implementation, cross-carrier scheduling grouping may be performed without grouping the cells into PUCCH groups. In an example implementation, cells may be grouped in PUCCH groups, and cells in each PUCCH group may be grouped into one or more cross-carrier scheduling groups.

Figure 14:
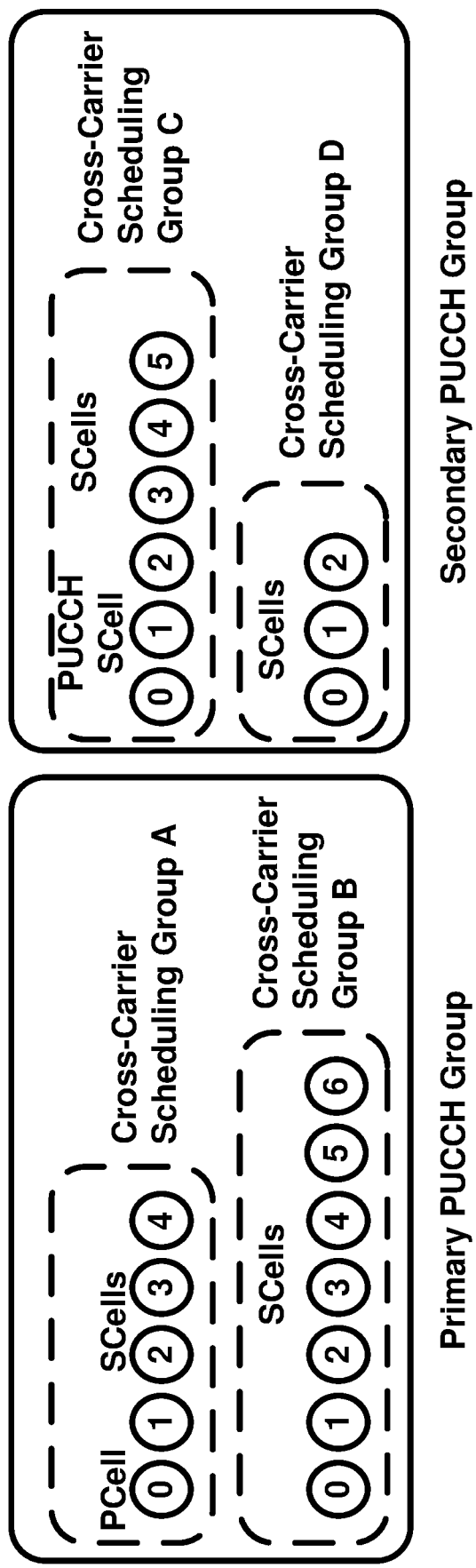
FIG. 14 shows an example cell grouping as per an aspect of an embodiment of the present invention.

FIG. 14 shows an example grouping as per an aspect of an example embodiment. 21 cells are configured and grouped into two PUCCH groups. The primary PUCCH group comprises 12 cells. The secondary PUCCH group comprises 9 cells. The cells in the primary PUCCH group are grouped into two cross-carrier scheduling groups. Cross-carrier scheduling group A comprises 5 cells with CIF 0 to 5, and cross-carrier scheduling group B comprises 7 cells with CIF 0 to 6. The same CIF may be reused in different cross-carrier scheduling groups. A cross-carrier scheduling group including only one cell may not require a CIF (a cell may schedule itself). In the example FIG. 14, cross-carrier scheduling group A includes 5 cells including the PCell. The PCell may schedule other cells in the group and itself (PCell). DCI transmitted on PCell and scheduling PCell may not include a CIF field. In an example, a DCI transmitted on a serving cell to schedule one or more TBs on the same serving cell may not include a CIF. In example FIG. 14, the secondary PUCCH group comprises two cross-carrier scheduling groups. Cross carrier scheduling may or may not be configured for cells in a PUCCH cell group. As shown in FIG. 14, a cross-carrier group cannot include cells from both primary PUCCH group and secondary PUCCH group.

Cells are grouped into PUCCH groups according to some example embodiments. In an example embodiment, cells may be grouped in two PUCCH groups. Cells in a PUCCH group may be grouped into cross-carrier scheduling subgroups. A PUCCH group may include one cell with PUCCH resources. The primary PUCCH group includes PCell with PUCCH resources, and the secondary PUCCH group may include a secondary PUCCH SCell. Uplink control information related to cells in a PUCCH group is transmitted on the associated PUCCH cell in the group.

In an example embodiment, a cross-carrier scheduling group (subgroup) includes cells within a single PUCCH group. Cross-carrier scheduling may be configured within a subgroup. Subgroups may not include cells from two different PUCCH groups as shown FIG. 14. Cross-carrier scheduling within a subgroup may be supported by a CIF of 3 bits in DL/UL DCI formats to indicate a serving cell with DL/UL data transmission among up to 8 cells. A cell in a cross-carrier scheduling subgroup may be identified by a number from 0 to 7 within that subgroup. The same CIF may be reused in different cross-carrier scheduling subgroups. In this specification, a group of one or more cells within another group may be called a group or a subgroup of one or more cells. The term group or subgroup may be used inter-changeably and refer to a group of one or more cells.

An example embodiment may provide grouping mechanisms for downlink cross carrier scheduling as well as uplink control channel transmission. A set of constraints may be introduced in PUCCH transmission, cross carrier scheduling and subgrouping cells within the same PUCCH group. These constraints may provide a mechanism for PUCCH information transmission as well as cross carrier scheduling configuration. Cross carrier scheduling is limited within a cross-carrier scheduling group (subgroup) and a 3 bit CFI may be employed for cross carrier scheduling. A PUCCH group may include one PUCCH cell for uplink PUCCH information transmission for cells within the PUCCH group. A cross-carrier scheduling group may include a cell that carries scheduling information for all the cells within the cross-carrier scheduling group.

In an example embodiment, PUCCH resources of the PUCCH cell in a PUCCH group may comprise resources for UCI transmission of different sets of cells. PUCCH resources may be divided in time, frequency (Resource Blocks), and/or codes and a set of cells may share the assigned PUCCH resources. In an example embodiment, PUCCH sets of resources may be allocated to different CSI processes of different cells.

In an example embodiment, cells may be grouped in PUCCH groups. A PUCCH group may include one cell with PUCCH resources. The primary PUCCH group may include PCell with PUCCH resources, and a secondary PUCCH group may include a secondary PUCCH SCell. Control information related to cells in a PUCCH group is transmitted on the associated PUCCH cell in the group. In an example embodiment, cross carrier scheduling may be permitted only within a PUCCH group. Cross-carrier scheduling within a PUCCH group may be supported by a CIF of 3 bits in DL/UL DCI formats to indicate a serving cell with DL/UL data transmission among up to 8 cells. A cell in a PUCCH group may be identified by a number from 0 to 7 within that subgroup.

The cells are configured and assigned to different cell groups via a semi-static manner using RRC control messages. In an example embodiment, the size of CIF may be 3 bits. This may restrict the maximum number of carriers scheduled by one carrier. Up to 8 PDSCH/PUSCH cells may be linked to one (e)PDCCH cell. In an example embodiment, the cells may be divided into different groups. In an example embodiment, the maximum cell number of a cross-carrier scheduling group (or subgroup) may be limited to 8. Cross-carrier scheduling may be permitted within a cross-carrier scheduling group (or subgroup).

With this grouping, a pair of scheduling cell and scheduled cell may be within the same cross-carrier scheduling group (or subgroup). Groups may be semi-statically configured and the mapping relationship of one or more cells to a scheduling cell may be signaled via higher layer signaling (via RRC control messages). The cross-carrier scheduling may happen within a cross-carrier scheduling group. A 3-bit CIF field may be employed to support cross-CC scheduling.

In an example embodiment, the group ID of a cross-carrier scheduling group is the same as the scheduling cell index (identifier). In an example embodiment, signaling overhead for DCI control signaling may be reduced. Cell groups for cross-carrier scheduling may be configured by higher layer signaling. A cell in a cross-carrier scheduling group may be configured as a scheduling cell with (E)PDCCH. The scheduling cell may carry scheduling information (DCI) for itself (the scheduling cell) and one or more other cells in the cross-carrier scheduling group.

In an example embodiment, the eNB may transmit to a UE one or more RRC messages comprising configuration parameters of a plurality of cells. The one or more messages may comprise information about configuration of a plurality of PUCCH groups. The one or more messages may comprise information about cross-carrier scheduling groups. In an example embodiment, the configuration parameters for a cell may include a cross carrier scheduling configuration information element (IE). The configuration parameters (e.g. the cross-carrier scheduling configuration IE) of a cell may comprise: a cell identifier (index) of the scheduling cell, and a CIF identifying the scheduled cell (the cell). The cell identifier may employ 5 bits (have a length of 5 bits) and the CIF may employ 3 bits (have a length of 3 bits). The cell identifier may be a number smaller than 32, and the CIF may be a number less than 8. The configuration parameters may indicate that the scheduling cell is employed for cross carrier scheduling of the scheduled cell (e.g. the cell). The wireless device may receive a DCI on a control channel ((e)PDCCH) of the scheduling cell for at least one packet transmitted/received on the scheduled cell. The DCI may comprise the CIF for the scheduled cell. The wireless device may transmit/receive at least one packet on the scheduled cell on radio resources identified by the DCI.

In an example embodiment, the cross carrier scheduling configuration IE of a cell may include one or more of the following parameters: a parameter indicating whether cross carrier scheduling is configured for the cell, the cell identifier (index) of the scheduling cell, the CIF identifying the cell, and/or a starting OFDM symbol number of the physical downlink shared channel of the cell. The CIF field indicates the CIF value used in the scheduling cell to indicate the cell. If the parameter indicates that cross carrier scheduling is not configured for the cell, the UE may decode the (e)PDCCH of the cell to decode DCI for the cell. The cell identifier (index) of the scheduling cell may indicate which cell signals the downlink allocations and uplink grants for the SCell.

Figure 15:
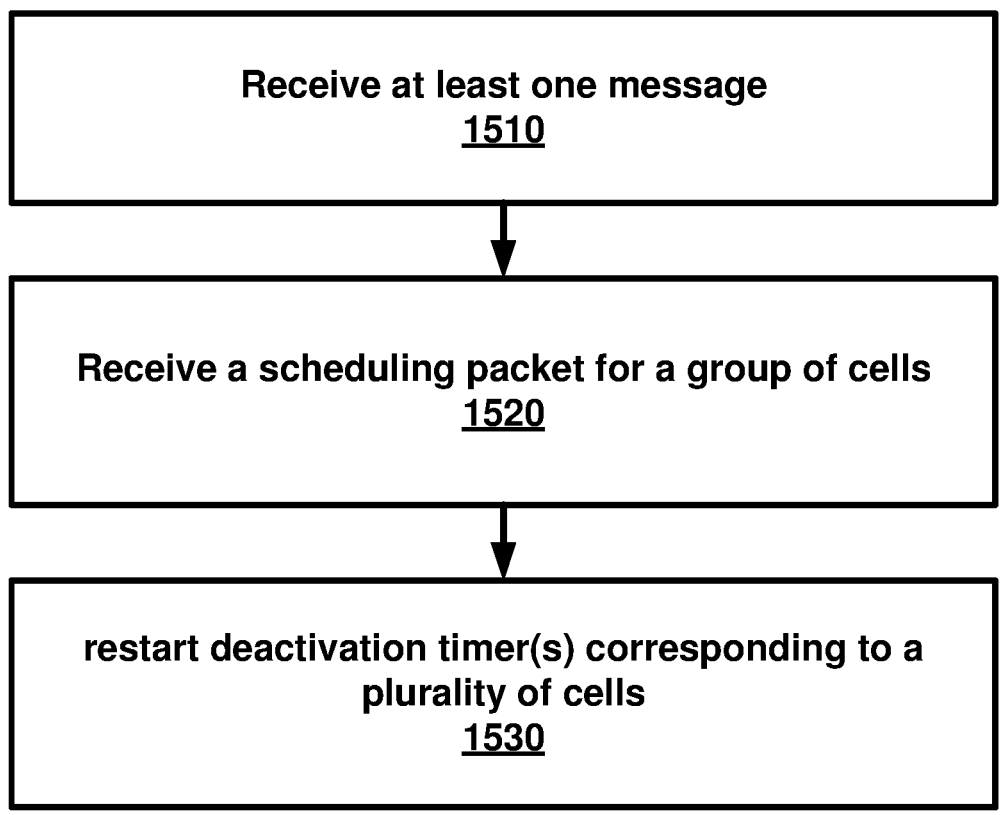
FIG. 15 is an example flow diagram as per an aspect of an embodiment of the present invention.

FIG. 15 is an example flow diagram as per an aspect of an embodiment of the present invention. A wireless device may receive at least one message from a base station at 1510. The message(s) may comprise configuration parameters of a plurality of cells. The configuration parameters may comprise a deactivation timer value for at least one deactivation timer of a plurality of secondary cells. According to an embodiment, the at least one message may comprise parameters indicating a first plurality of cells in the group of cells.

In LTE-A Rel-12, one (e)PDCCH may schedule PDSCH/PUSCH(s) in one serving cell. In an example embodiment, multi-component carrier (CC) and/or multi-subframe (SF) scheduling may be implemented to reduce DCI transmission overhead. For example, cell groups and/or subframe groups may be configured. The cell groups and/or subframe groups may be scheduled by a single DCI. Multi-subframe and/or multi-cell scheduling may be implemented for CA when a relatively large number cells can be configured (e.g. up to 32 cells). In certain conditions, an (e)PDCCH may be transmitted to schedule one or more TBs for transmission on PDSCH/PUSCHs in multiple subframes of one CC or on multiple CCs. These enhancements may be advantageous since it reduces control signaling overhead and reduces the number of blind decoding by a UE. New (e)PDCCH signaling design may be needed to control the overhead when the number of carriers increases. Parameters such as signaling overhead, blind decoding needs, and false alarm probability may be considered.

In an example embodiment, the scheduling overhead may be reduced by selecting proper (lower) resource assignment granularity when the number of configured and scheduled CCs is relatively large. In an example embodiment, a grant is applicable to a cell group and/or a subframe group. RRC may define the CC groups, and grants may be implemented for a cell group and/or subframe group. The one or more scheduling fields may be common for cells or subframes in the group, e.g. RB assignment, MCS, and/or MIMO parameters, etc.

Multi-subframes and/or multi-cells scheduling may be for example applicable when similar channel conditions are observed for the multi-subframes and/or the multi-cells. New format may be defined for DCI that may include references to the multi-subframes and/or multi-cells, e.g. subframe group index and/or cell group index for scheduling. Newly designed uplink and downlink grants for cell groups and/or subframe groups may reduce control overhead, reduced number of blind decodes, and reduced false alarm probability.

In an example embodiment, some of DCI parameters may be semi-statically configured, such as DCI length, MCS, and/or power parameters. These parameters may be calculated based on UE channel conditions, the number of configured cells and cell groups and/or subframe groups configuration. RRC signaling may configure the groups of CCs or groups of subframes. RRC signaling may comprise the number of groups, group index and/or cell association to a group. RRC signaling may comprise subframe group parameters, for example the duration, subframe numbers, and/or subframe bitmap indicating a subset of subframes.

In an example embodiment, DCI content may comprise for example, scheduling bitmap, index of subframe groups and/or cell groups. For example, a bitmap may identify which activated cells or subframes are scheduled. In another example embodiment, indexes may be used to determine the subframe groups or cell groups that are scheduled.

The resource block assignment for a cell group and/or subframe group may employ one or more bitmaps indicating the subframe groups and/or cell groups, and/or one or more indexes indicating the subframe groups and/or cell groups. Resource block allocation is for the scheduled cell groups or subframe groups. RBs of scheduled CCs and/or subframe(s) within a cell group are employed for transmission of transport block(s). In an example, the DCI may include information about the group of subframes, e.g., burst duration, subframes configuration information, and/or indexes to subframes.

New cell activation/deactivation mechanisms may be implemented when cell groups and/or subframe groups are implemented. In an example embodiment, UE maintains an sCellDeactivationTimer for an SCell in a PUCCH group (UE at least includes on PUCCH group including the primary cell). The MAC entity may for a TTI and for a configured SCell perform certain functions according the status of sCellDeactivationTimer and other operational parameters.

If the sCellDeactivationTimer associated with an activated SCell expires in a TTI, in the TTI (and according to a pre-defined timing), the UE may deactivate the SCell; stop the sCellDeactivationTimer associated with the SCell; and flush HARQ buffers associated with the SCell.

In an example embodiment when cell group scheduling is configured, for an activated SCell in a PUCCH group, if PDCCH on the activated SCell indicates an uplink grant or downlink assignment; or if PDCCH on the Serving Cell scheduling the activated SCell indicates an uplink grant or a downlink assignment for the activated SCell, or if PDCCH on the Serving Cell scheduling the activated SCell (or a group including the activated cell) indicates an uplink grant or a downlink assignment for a group including the activated cell, the UE may restart the sCellDeactivationTimer associated with the activated SCell. In the example embodiment, when a PDDCH grant, grants resources for a group of activated cells, the sCellDeactivationTimer(s) of cell(s) in the group are restarted. This embodiment may keep the cells of a scheduling cell group in the activated state together. Cell group in the example embodiment may be determined by RRC configuration, and/or by the bitmap in the PDCCH grant. The bitmap may indicate a subset of cells (e.g. cell group) to which the grant applies.

The implementation of an example sCellDeactivationTimer maintenance may result in restarting the sCellDeactivationTimer associated with an SCell, when PDCCH grants are received for the cell group. Such an sCellDeactivationTimer maintenance is simple to implement and may result in an efficient deactivation mechanism that results in lower battery power consumption in the UE.

In an example embodiment when subframe group scheduling is configured, for an activated SCell in a PUCCH Cell group, if PDCCH on the activated SCell indicates an uplink grant or downlink assignment; or if PDCCH on the Serving Cell scheduling the activated SCell indicates an uplink grant or a downlink assignment for the activated SCell, the UE may restart the sCellDeactivationTimer associated with the SCell. In addition, for an activated SCell in a PUCCH Cell group, if PDCCH on the activated SCell indicates an uplink grant or downlink assignment for a given TTI; or if PDCCH on the Serving Cell scheduling the activated SCell indicates an uplink grant or a downlink assignment for the activated SCell for a given TTI, the UE may restart the sCellDeactivationTimer associated with the SCell in the given TTI.

In legacy R-12 systems, the sCellDeactivationTimer is restarted in a TTI based on PDCCH transmissions in that TTI. When subframe grouping is configured, a PDCCH may include grants for uplink or downlink transmissions in multiple subframes. In the example embodiments, when an uplink or downlink TB is communicated in a given subframe of an activated cell, the corresponding sCellDeactivationTimer is restarted. In example, a PDCCH transmitted in subframe 0 may provide grants for subframe 0 and 10. The corresponding sCellDeactivationTimer may be restarted at subframe 0. The corresponding sCellDeactivationTimer may be restarted at subframe 10. If the assignment is for a period including multiple subframes, the corresponding sCellDeactivationTimer may be restarted at the last subframe of the subframe group grant. In an example embodiment, if the assignment is for a period including multiple subframes, the corresponding sCellDeactivationTimer may be restarted at an offset before the last subframe of the subframe group grant. For example, the offset may be zero (at the last subframe), or 4 (four subframe before the last subframe), etc.

The implementation of an example sCellDeactivationTimer maintenance may result in restarting the sCellDeactivationTimer associated with an SCell, when uplink and downlink data are transferred on the cell. Such an sCellDeactivationTimer maintenance is simple to implement and may result in an efficient deactivation mechanism that results in lower battery power consumption in the UE.

The above embodiments may be combined with the embodiments for sCellDeactivationTimer maintenance of a PUCCH SCell to ensure that the PUCCH SCell is activated state at least as long of at least one other cell in the associated PUCCH group is active.

At 1520, the wireless device may receive a scheduling packet for a group of cells. The group of cells may comprise a first plurality of secondary cells in the plurality of secondary cells. According to an embodiment, the scheduling packet may be received on a downlink physical control channel. According to an embodiment, the scheduling packet may indicate one or more resource allocations. According to an embodiment, the scheduling packet may indicate one or more transmission formats for one or more packets transmitted on the first plurality of secondary cells. The wireless device may transmit the one or more packets to a base station. According to an embodiment, the scheduling packet may indicate one or more resource allocations and/or one or more transmission formats for one or more packets received on the first plurality of secondary cells. The wireless device may receive the one or more packets from a base station.

According to an embodiment, the wireless device may maintain each deactivation timer for each of the first plurality of secondary cells. At 1530, the wireless device may restart each deactivation timer corresponding to each of the first plurality of cells (except a PUCCH SCell, if the first plurality of cells include a PUCCH SCell). A deactivation timer may not be maintained for a PUCCH SCell. The eNB/UE may not maintain a deactivation timer for a PUCCH SCell. The eNB/UE may activate/deactivate a PUCCH SCell by eNB transmitting an A/D MAC CE to the eNB indicating activation or deactivation of the PUCCH SCell.

Figure 16:
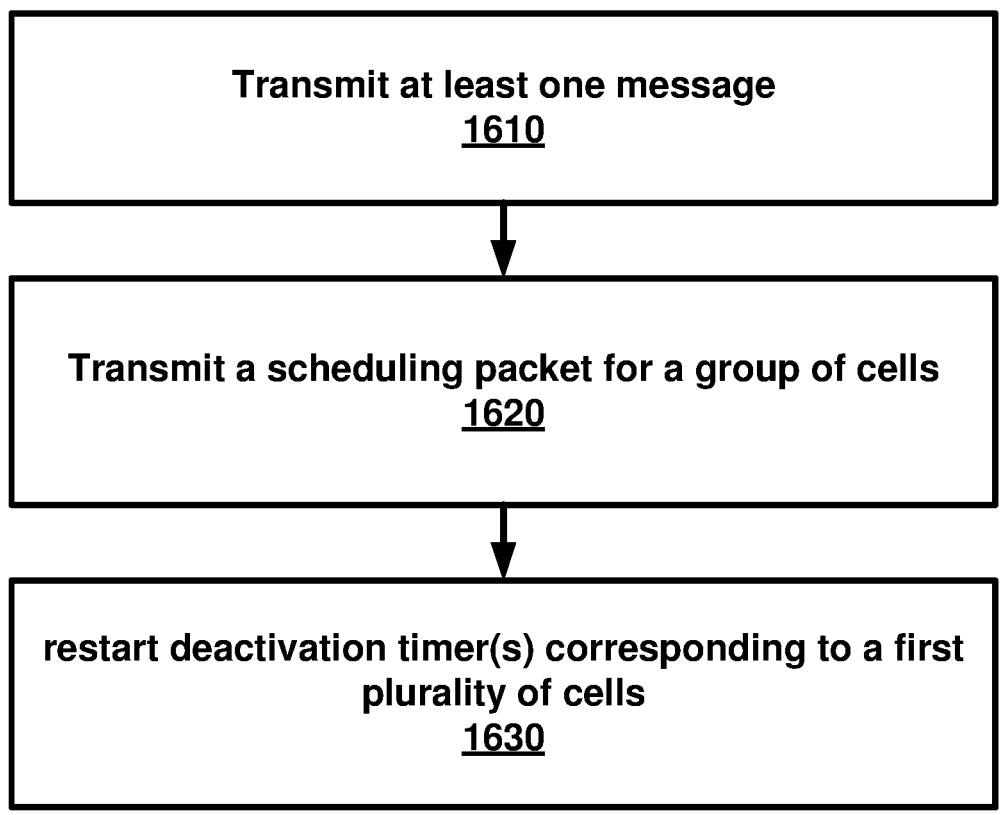
FIG. 16 is an example flow diagram as per an aspect of an embodiment of the present invention.

FIG. 16 is an example flow diagram as per an aspect of an embodiment of the present invention. A base station may transmit at least one message to a wireless device at 1610. The message(s) may comprise configuration parameters of a plurality of cells. The configuration parameters may comprise a deactivation timer value for at least one deactivation timer of a plurality of secondary cells of the wireless device. According to an embodiment, the at least one message may comprise parameters indicating a first plurality of cells in the group of cells.

At 1620, the base station may transmit a scheduling packet for a group of cells. The group of cells may comprise a first plurality of secondary cells in the plurality of secondary cells. According to an embodiment, the scheduling packet may be transmitted on a downlink physical control channel. According to an embodiment, the scheduling packet may indicate one or more resource allocations. According to an embodiment, the scheduling packet may indicate one or more transmission formats for one or more packets to be received on the first plurality of secondary cells. The base station may receive the one or more packets from the wireless device. According to an embodiment, the scheduling packet may indicate one or more resource allocations and/or one or more transmission formats for one or more packets transmitted on the first plurality of secondary cells. The base station may transmit the one or more packets to a wireless device.

According to an embodiment, the base station may maintain each deactivation timer for each of the first plurality of secondary cells of the wireless device. At 1630, the base station may restart each deactivation timer corresponding to each of the first plurality of cells (except a PUCCH SCell, if the first plurality of cells include a PUCCH SCell). A deactivation timer may not be maintained for a PUCCH SCell. The eNB/UE may not maintain a deactivation timer for a PUCCH SCell. The eNB/UE may activate/deactivate a PUCCH SCell by eNB transmitting an A/D MAC CE to the eNB indicating activation or deactivation of the PUCCH SCell.

Figure 17:
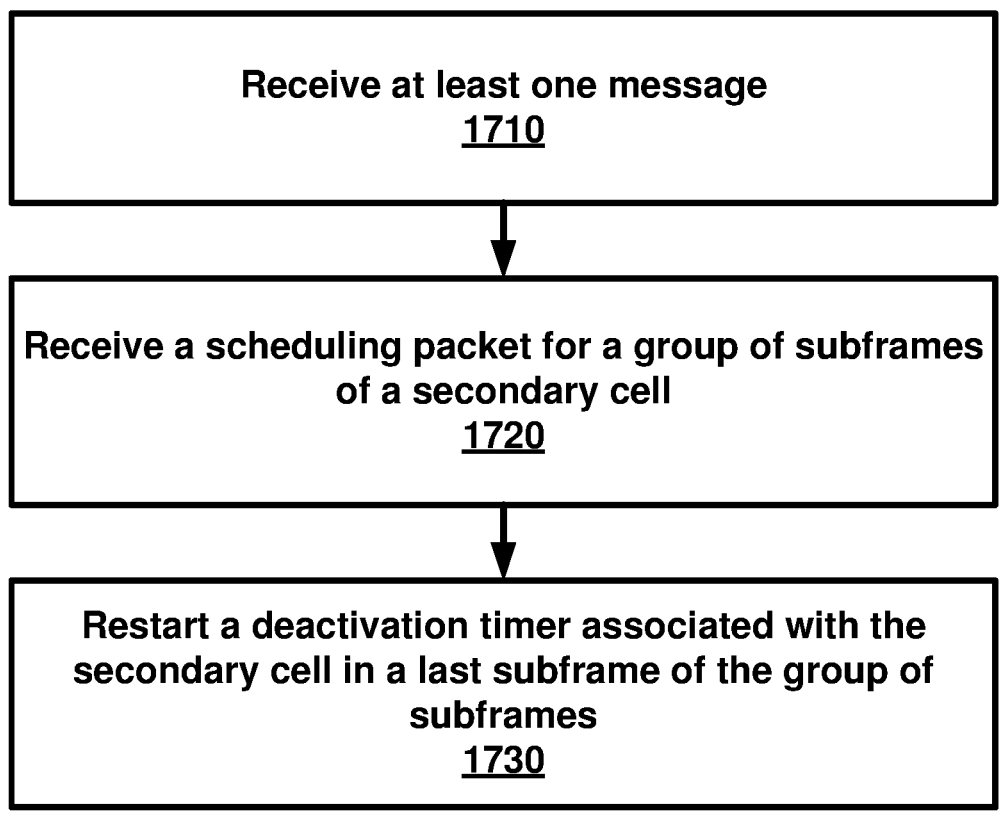
FIG. 17 is an example flow diagram as per an aspect of an embodiment of the present invention.

FIG. 17 is an example flow diagram as per an aspect of an embodiment of the present invention. A wireless device may receive at least one message from a base station at 1710. The message(s) may comprise configuration parameters of a plurality of cells. The configuration parameters may comprise a deactivation timer value for at least one deactivation timer of a plurality of secondary cells. According to an embodiment, the at least one message may comprise parameters indicating the first plurality of cells in the group of cells.

At 1720, the wireless device may receive a scheduling packet for a group of subframes of a secondary cell in the plurality of secondary cells. According to an embodiment, the group of subframes may comprise a number of subframes in the group of subframes. According to an embodiment, the scheduling packet may comprise one or more indexes indicating one or more subframes in the group of subframes. According to an embodiment, the scheduling packet may indicate one or more resource allocations and/or one or more transmission formats for one or more packets transmitted in the group of subframes. The wireless device may transmit the one or more packets to a base station. According to an embodiment, the scheduling packet may indicate one or more resource allocations and one or more transmission formats for one or more packets received in the group of subframes. The wireless device may transmit the scheduling packet on a downlink physical control channel. According to an embodiment, the wireless device may receive the one or more packets from a base station. According to an embodiment, the wireless device may maintain the deactivation timer for the secondary cell. At 1730, the wireless device may restart a deactivation timer associated with the secondary cell in a last subframe of the group of subframes. A deactivation timer may not be a maintained (started and/or restarted) for a PUCCH SCell.

Figure 18:
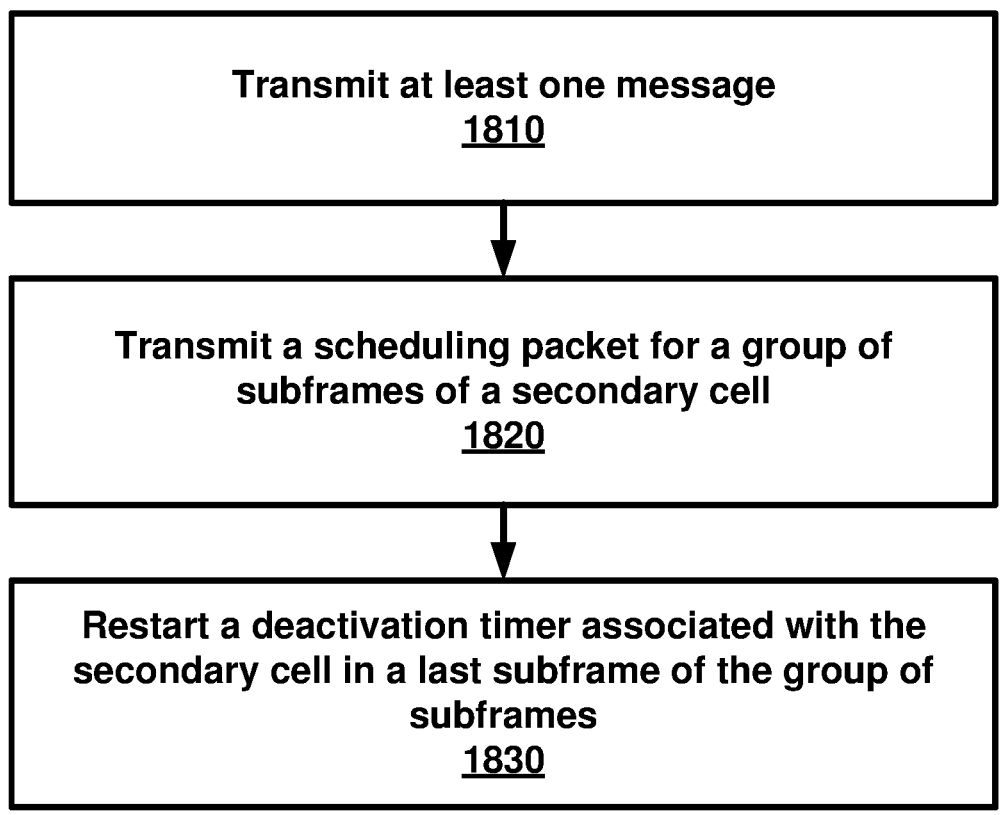
FIG. 18 is an example flow diagram as per an aspect of an embodiment of the present invention.

FIG. 18 is an example flow diagram as per an aspect of an embodiment of the present invention. A base station may transmit at least one message to a wireless device at 1810. The message(s) may comprise configuration parameters of a plurality of cells. The configuration parameters may comprise a deactivation timer value for at least one deactivation timer of a plurality of secondary cells of the wireless device. According to an embodiment, the at least one message may comprise parameters indicating the first plurality of cells in the group of cells.

At 1820, the base station may transmit a scheduling packet for a group of subframes of a secondary cell in the plurality of secondary cells. According to an embodiment, the group of subframes may comprise a number of subframes in the group of subframes. According to an embodiment, the scheduling packet may comprise one or more indexes indicating one or more subframes in the group of subframes. According to an embodiment, the scheduling packet may indicate one or more resource allocations and/or one or more transmission formats for one or more packets to be received in the group of subframes. The base station may receive the one or more packets from the wireless device. According to an embodiment, the scheduling packet may indicate one or more resource allocations and one or more transmission formats for one or more packets transmitted in the group of subframes. The base station may transmit the scheduling packet on a downlink physical control channel. According to an embodiment, the wireless device may receive the one or more packets from a base station. According to an embodiment, the base station may maintain the deactivation timer for the secondary cell of the wireless device. At 1830, the base station may restart a deactivation timer associated with the secondary cell in a last subframe of the group of subframes. A deactivation timer may not be a maintained (started and/or restarted) for a PUCCH SCell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/ simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A base station comprising:
   one or more processors; and
   memory storing instructions that, when executed by the one or more processors, cause the base station to:
   transmit, to a wireless device, radio resource control (RRC) signaling comprising parameters for a plurality of time intervals of a secondary cell for communicating with the wireless device;
   transmit, via a physical downlink control channel (PDCCH), downlink control information (DCI) comprising a resource block assignment for the plurality of time intervals of the secondary cell for communicating with the wireless device; and
   restart a deactivation timer associated with the secondary cell in response to communicating, via the secondary cell, an uplink packet or a downlink packet with the wireless device during a first time interval of the plurality of time intervals.

2. The base station of claim 1, wherein the instructions further cause the base station to restart the deactivation timer associated with the secondary cell in response to communicating a second uplink packet or a second downlink packet during a second time interval of the plurality of time intervals.

3. The base station of claim 1, wherein the RRC signaling comprises an index for the plurality of time intervals.

4. The base station of claim 3, wherein the DCI comprises:
the index for the plurality of time intervals; and
a resource block assignment for the plurality of time intervals.

5. The base station of claim 4, wherein the instructions further cause the base station to restart the deactivation timer associated with the secondary cell in response to communicating a second uplink packet or a second downlink packet during a second time interval of the plurality of time intervals.

6. The base station of claim 4, wherein:
the uplink packet comprises an uplink transport block; and
the downlink packet comprises a downlink transport block.

7. The base station of claim 4, wherein the RRC signaling comprises a time duration for the plurality of time intervals.

8. The base station of claim 1, wherein the first time interval is a first occurrence in the plurality of time intervals.

9. The base station of claim 1, wherein a time interval of the plurality of time intervals comprises a subframe.

10. The base station of claim 1, wherein the RRC signaling comprises a bitmap indicating one or more time intervals of the plurality of time intervals.

11. A base station comprising:
one or more processors; and
memory storing instructions that, when executed by the one or more processors, cause the base station to:
transmit, to a wireless device, radio resource control (RRC) signaling comprising parameters of a resource assignment for a plurality of time intervals of a secondary cell for communicating with the wireless device; and
restart a deactivation timer associated with the secondary cell in response to communicating, via the secondary cell, an uplink packet or a downlink packet with the wireless device during a first time interval of the plurality of time intervals.

12. The base station of claim 11, wherein the instructions further cause the base station to restart the deactivation timer associated with the secondary cell in response to communicating a second uplink packet or a second downlink packet during a second time interval of the plurality of time intervals.

13. The base station of claim 11, wherein the RRC signaling comprises an index for the plurality of time intervals.

14. The base station of claim 13, wherein the instructions cause the base station to transmit, via a physical downlink control channel (PDCCH), downlink control information (DCI) comprising a resource block assignment for the plurality of time intervals of the secondary cell for communicating with the wireless device, wherein the DCI comprises:
the index for the plurality of time intervals; and
a resource block assignment for the plurality of time intervals.

15. The base station of claim 14, wherein the instructions further cause the base station to restart the deactivation timer associated with the secondary cell in response to communicating a second uplink packet or a second downlink packet during a second time interval of the plurality of time intervals.

16. The base station of claim 14, wherein:
the uplink packet comprises an uplink transport block; and
the downlink packet comprises a downlink transport block.

17. The base station of claim 14, wherein the RRC signaling comprises a time duration for the plurality of time intervals.

18. The base station of claim 11, wherein the first time interval is a first occurrence in the plurality of time intervals.

19. The base station of claim 11, wherein a time interval of the plurality of time intervals comprises a subframe.

20. The base station of claim 11, wherein the RRC signaling comprises a bitmap indicating one or more time intervals of the plurality of time intervals.

* * * * *